United States Patent [19]
Kosuga et al.

[11] Patent Number: 6,156,243
[45] Date of Patent: Dec. 5, 2000

[54] MOLD AND METHOD OF PRODUCING THE SAME

[75] Inventors: Hiroyuki Kosuga, Tokyo; Yoshiatsu Yokoo, Hidaki, both of Japan

[73] Assignee: Hoya Corporation, Tokyo, Japan

[21] Appl. No.: 09/064,148

[22] Filed: Apr. 22, 1998

[30] Foreign Application Priority Data

| Apr. 25, 1997 | [JP] | Japan | H9-108831 |
| Apr. 25, 1997 | [JP] | Japan | H9-108833 |
| Jun. 6, 1997 | [JP] | Japan | H9-149214 |

[51] Int. Cl.[7] ................ B29D 11/00
[52] U.S. Cl. .......... 264/2.5; 264/1.25; 264/219; 216/11; 216/24; 216/57; 216/58; 216/74; 216/77; 216/81
[58] Field of Search ............. 264/1.25, 2.5, 264/219; 216/11, 24, 57, 58, 74, 77, 81

[56] References Cited

U.S. PATENT DOCUMENTS

| 4,294,649 | 10/1981 | Sarka . |
| 4,842,633 | 6/1989 | Kuribayashi et al. . |
| 5,348,616 | 9/1994 | Hartman et al. . |
| 5,723,174 | 3/1998 | Sato . |
| 5,770,120 | 6/1998 | Kamihara et al. .......... 264/2.5 |

FOREIGN PATENT DOCUMENTS

| 0 729 044 | 8/1996 | European Pat. Off. . |
| 64-52620 | 2/1989 | Japan . |
| 2-199402 | 8/1990 | Japan . |
| 3-242332 | 10/1991 | Japan . |
| 4-260621 | 9/1992 | Japan . |

*Primary Examiner*—Stanley S. Silverman
*Assistant Examiner*—Michael P. Colaianni
*Attorney, Agent, or Firm*—Nixon & Vanderhye P.C.

[57] ABSTRACT

(1) Alignment mark transfer portion(s) is/are formed on the transfer molding surface of a mold that is used for press-molding a optical element fixing member and having alignment marks; (2) alignment mark(s) is/are formed on the mold material by dry-etching, and the mold material is worked using the alignment mark(s) as a reference to form the transfer molding surface constituted by a plurality of transfer patterns, in order to obtain a mold for press-molding; and (3) the transfer patterns are formed by dry-etching, or a transfer molding bare surface for transfer patterns is formed by dry-etching and a mold release film is formed thereon to reflect the shape of the transfer molding base surface, in order to obtain a mold for press-molding.

4 Claims, 8 Drawing Sheets

Fig. 1 ( a )
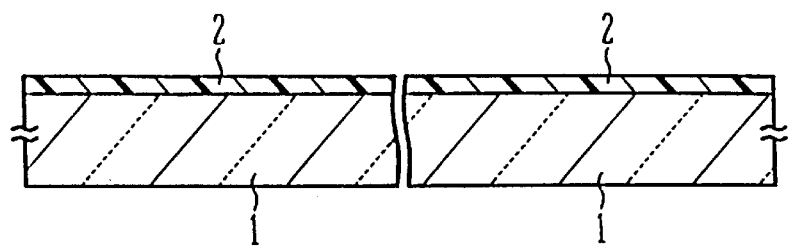
Fig. 1 ( b )
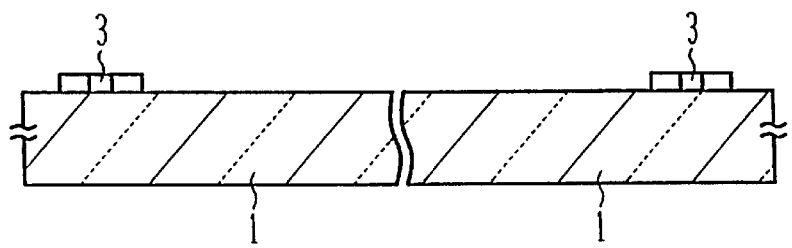
Fig. 1 ( c )
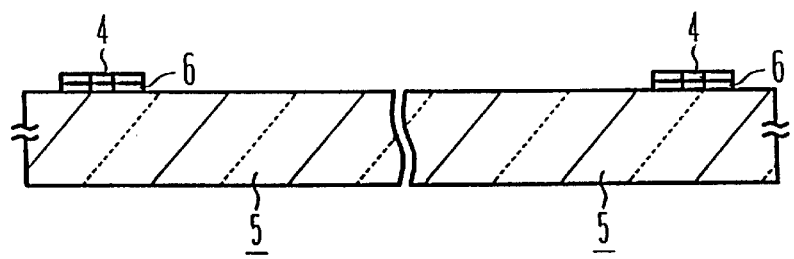

Fig. 7 ( a )
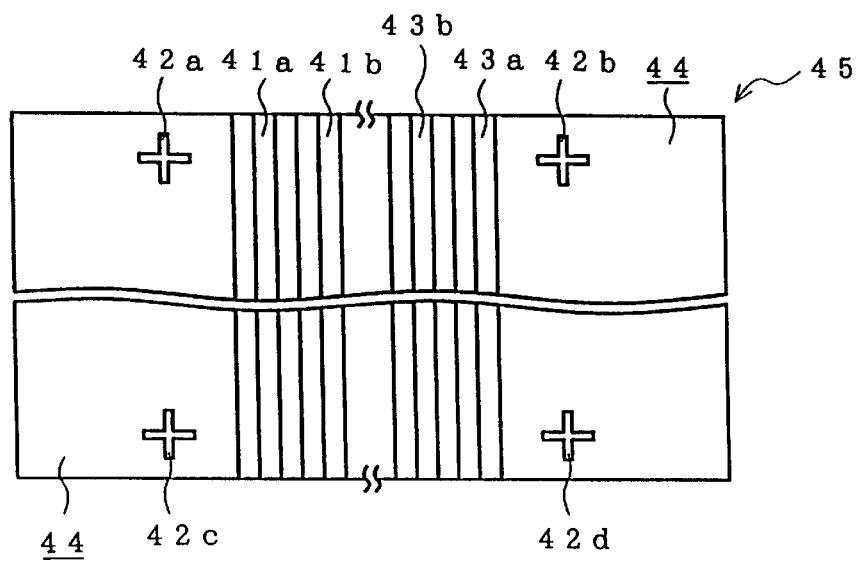
Fig. 7 ( b )
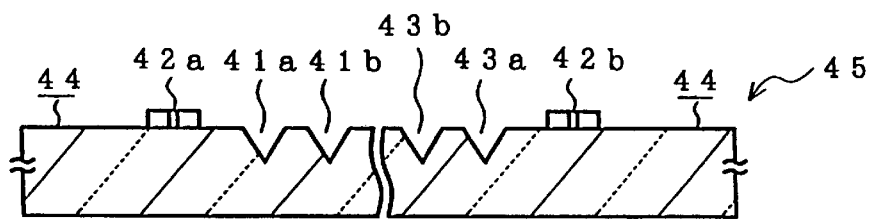

MOLD AND METHOD OF PRODUCING THE SAME

FIELD OF THE INVENTION

The present invention relates to a mold for obtaining a desired molded article by press-molding, to a method of producing the mold, and to a molded article obtained by using the mold.

DESCRIPTION OF THE PRIOR ART

Press-molding is a technology which makes it possible to produce molded articles having a predetermined shape maintaining a high productivity once a mold used for the press-molding is fabricated. At present, therefore, the molded articles of a variety of shapes have been produced by press-molding. Moreover, the press-molding makes it possible to mass-produce the molded articles maintaining high accuracy. Nowadays, therefore, products that require high degree of accuracy, such as optical element fixing member and diffraction elements, have been produced by press-molding.

Here, the "optical element fixing members" referred to as in this specification stand for members that are used for fixing or mounting a predetermined number of elements required for the transmission and reception of light or for the relay of light, as represented by optical elements such as micro-lens, polarizer plate, diffraction grating, wave plate, filter, optical amplifier, optical waveguide and optical fiber, as well as light-emitting elements such as semiconductor laser and light-emitting diode, and light-receiving elements such as photodiode, etc. (hereinafter, these elements are referred to as "optical elements"). In the optical element fixing member are, usually, formed ruggedness of a predetermined shape for fixing or mounting the optical elements. Depending upon the applications, however, the members are produced in the shape of a flat plate without ruggedness. Furthermore, the "diffraction elements" referred to as above stand for optical elements used for dispersing, deflecting or converging light by utilizing the diffraction of light, such as diffraction grating and zone plate.

For the transmission or reception of light or for the relay of light, it is necessary to optically connect desired optical elements together (hereinafter referred to as "optical interconnection") on an optical element fixing member or between the two optical element fixing members. To accomplish the optical interconnection, the optical elements must be aligned highly accurately.

In optically connecting the quartz-based single-mode optical fibers together, for example, the alignment must be accomplished as highly accurately as that the amount of deviation between the optical axes is within about ±1 $\mu$m from the standpoint of decreasing the connection loss (down to, for example, 0.1 dB or less) that is caused by a deviation of the optical axes in the optically connected portion.

So far, an active alignment by using a precision stage has been employed for the optical interconnection of the optical elements on the optical element fixing member and for the optical interconnection of the optical elements between the optical element fixing members to which the optical elements are fixed or on which the optical elements are mounted. In optically connecting the optical fibers together relying upon the active alignment, light that is going out from one optical fiber is permitted to fall on the other optical fiber, and the precision stage is driven over a wide range so that the amount of incident light becomes a maximum, thereby to accomplish the positioning between the two.

However, the optical interconnection based on the active alignment requires an extended period of time since the precision stage must be driven over a wide range as described above. Moreover, the automated operation causes the structure of the device to become complex, which makes it difficult to realize a device for accomplishing the active alignment maintaining a desired accuracy.

The optical interconnection of the optical elements requires a high degree of aligning accuracy as described above. In fixing or mounting the optical element(s) on the optical element fixing member, therefore, it is desired that the optical element(s) is/are fixed or mounted highly accurately. In order to highly accurately secure or mount the optical element(s) on the optical element fixing member, furthermore, it becomes necessary to highly accurately mold the optical element fixing member.

Under the above-mentioned circumstances, the optical element fixing member have nowadays been produced by press-molding. In order to obtain products of a predetermined shape by press-molding, first, a mold of the predetermined shape must be fabricated. Fabricating the mold relying upon the conventional method, however, involves difficulties as described below.

That is, many optical element fixing members have a ruggedness of a predetermined shape. To obtain such an optical element fixing member by press-molding, it becomes necessary to use a mold having a highly accurately formed transfer molding surface constituted by a plurality of transfer patterns. To obtain the mold having a highly accurately formed transfer molding surface constituted by the plurality of transfer patterns, it has heretofore been attempted to form, in advance, a surface on a mold material that will become a side surface of the mold and to machine the mold material using a machine such as grinder by utilizing the above side surface as a reference surface, thereby to form the transfer molding surface constituted by the plurality of transfer patterns. At the time of forming the surface that becomes the side surface of the mold, however, it is difficult to prevent the occurrence of pitching on this surface. Occurrence of pitching makes it difficult to correctly specify the position of the surface. It is further desired to eliminate the breakage from the standpoint of improving the durability of the mold and improving the productivity. For this purpose, it is often done to form on the mold material the side surface of the mold followed by chamfering and, then, to form the transfer molding surface. After the chamfering, however, it becomes difficult to correctly specify the position of the above-mentioned surface (which becomes the side surface of the mold).

On account of these reasons, the conventional method in which a surface to be become the side surface of the mold is, first, formed on the mold material, and the transfer molding surface is formed by machining by using this surface as a reference surface, involves too many difficulties in obtaining a mold having highly precise transfer molding surfaces constituted by the plurality of transfer patterns.

On the other hand, the diffraction elements have heretofore been produced by highly accurately forming a fine pattern of a desired shape on the material relying on a mechanical ruling method, a two-beam interference method or an etching method, or relying on a replica method by using the thus obtained diffraction element as a master. In recent years, it has been attempted to mass-produce diffraction elements made of a glass relying on the press-molding from the standpoint of accomplishing high durability, small change in the characteristics despite a change in the ambient temperature, and low cost.

As the molds for obtaining the glass diffraction elements by press-molding, there have been known the one in which a transfer pattern is formed by grinding the desired surface of the mold material into a predetermined shape, as well as the following molds (a) and (b).

(a) A mold in which a transfer pattern is formed by polishing a desired surface of a base member to a mirror surface, forming a desired thin film on the mirror surface, and patterning the surface (surface layer) of the thin film into a predetermined shape (see Japanese Patent Laid-Open (Kokai) Nos. Sho 64-52620(1989) and Hei 3-242333(1991) and Japanese Patent Publication (Kokoku) No. Hei 8-23602 (1996)).

(b) A mold in which a desired thin film is formed on a desired surface of a base member directly or via an intermediate layer, the thin film is patterned into a predetermined shape, and a transfer pattern is formed by the patterned thin film and by the surface of the base member that is exposed due to the patterning or by the surface of the intermediate layer (see Japanese Patent Laid-Open (Kokai) No. Hei 4-260621(1992)).

When the transfer pattern is formed by patterning the thin film on the base member into a predetermined shape as in the molds (a) and (b), the transfer pattern can be formed in a mold maintaining a higher degree of freedom of the its configuration than when the transfer pattern is formed by grinding a desired surface of the mold material and, besides, a highly precise transfer pattern can be easily obtained. However, these molds have a defect in that the transfer pattern itself has a shorter life than that of the mold in which the transfer pattern is formed on the mold material.

SUMMARY OF THE INVENTION

The present invention was accomplished in order to overcome the above-mentioned difficulties inherent in the prior art, and it is a first object of the present invention to provide a mold capable of producing, by press-molding, an optical element fixing member, which makes it possible, within short periods of time, to optically connect together the optical elements that are to be fixed or mounted, or to optically connect together the optical elements between the optical element fixing members to which the optical elements are fixed or on which the optical elements are mounted, to provide a method of producing the mold and to provide an optical element fixing member.

A second object of the present invention is to provide a method of easily producing a mold for press-molding having a highly precise transfer molding surface constituted by a plurality of transfer patterns.

A third object of the present invention is to provide a mold which capable of easily obtaining the one for press-molding having transfer patterns of a predetermined shape maintaining a high accuracy and featuring an extended life of the transfer patterns, and a method of producing the mold.

A fourth object of the present invention is to provide a method of producing a diffraction element of a glass at a low cost.

In order to accomplish the above-mentioned first object, the present invention deals with a mold having a transfer molding surface of a predetermined shape and is used for press-molding a shaping material to be molded into an optical element fixing member, wherein alignment mark-transfer portion(s) is/are formed on the transfer molding surface in order to obtain a molded article having alignment mark(s) (this mold is hereinafter referred to as "mold A").

In order to accomplish the above-mentioned first object, furthermore, the present invention deals with a method of producing a mold having a transfer molding surface of a predetermined shape and is used for press-molding a shaping material to be molded into an optical element fixing member, wherein shaping portion(s) for forming alignment mark transfer portion(s) is/are formed by dry-etching on the material of the mold so that said alignment mark transfer portion(s) is/are formed on the transfer molding surface of said mold for obtaining an optical element fixing member and having said alignment mark(s), a mold release film is formed so that said shaping portion(s) is/are covered and that the surface of said mold release film serves as said transfer molding surface, thereby to obtain a mold having said alignment mark transfer portion(s) which comprise said shaping portion(s) and said mold release film covering the surface(s) of said shaping portion(s), the surface of said mold release film serving as said transfer molding surface (this method is hereinafter referred to as "method aI").

In order to accomplish the above-mentioned first object, the present invention deals with another method of producing a mold having a transfer molding surface of a predetermined shape and is used for press-molding a shaping material to be molded into an optical element fixing member, wherein alignment mark transfer portion(s) is/are formed by dry-etching on the mold material so as to be positioned on the transfer molding surface of said mold in order to obtain an optical element fixing member and having said alignment mark(s) (this method is hereinafter referred to as "method aII").

In order to accomplish the above-mentioned first object, the present invention deals with an optical element fixing member, wherein alignment mark(s) for determining a positional relationship relative to other members is/are integrally molded, and said alignment mark(s) have a surface roughness which is different from a surface roughness on the periphery of the alignment mark(s).

In order to accomplish the above-mentioned second object, the present invention deals with a method of producing a mold having a transfer molding surface constituted by a plurality of transfer patterns and is used for press-molding a shaping material to be molded into an article of a predetermined shape, wherein alignment mark(s) is/are formed on the mold material by dry-etching, and said mold material is worked using said alignment mark(s) as a reference in order to form said transfer molding surface constituted by said plurality of transfer patterns (this method is hereinafter referred to as "method bI").

In order to accomplish the above-mentioned second object, furthermore, the present invention deals with another method of producing a mold having a transfer molding surface constituted by a plurality of transfer patterns and is used for press-molding a shaping material to be molded into an article of a predetermined shape, wherein alignment mark(s) is/are formed on the mold material by dry-etching, said mold material is worked using said alignment mark(s) as a reference in order to form a transfer molding bare surface constituted by bare transfer patterns which serve as bases for said transfer patterns, and a mold release film is formed so as to cover at least said transfer molding bare surface, the surface of said mold release film serving as the transfer molding surface (this method is hereinafter referred to as "method bII").

In order to accomplish the above-mentioned third object, the present invention deals with a mold comprising a base member having a transfer molding bare surface of a predetermined shape formed by dry-etching, and a mold release film formed on said transfer molding bare surface so as to reflex the shape of said transfer molding bare surface, the surface of said mold release film serving as a transfer molding surface (this mold is hereinafter referred to as "mold CI").

In order to accomplish the above-mentioned third object, furthermore, the present invention deals with a mold having a transfer molding surface formed on the mold material by dry-etching (this mold is hereinafter referred to as "mold CII").

In order to accomplish the above-mentioned third object, the present invention provides a method of producing a mold by obtaining a base member by forming, on the mold material by dry-etching, a transfer molding bare surface that serves as a base for the transfer molding surface, and forming a mold release film on said transfer molding bare surface so as to reflect the shape of said transfer molding bare surface, the surface of said mold release film serving as a transfer molding surface (this method is hereinafter referred to as "method cI").

In order to accomplish the above-mentioned third object, furthermore, the present invention is concerned with another method of producing a mold by forming a transfer molding surface on the mold material by dry-etching (this method is hereinafter referred to as "method cII").

Moreover, in order to accomplish the above-mentioned fourth object, the present invention deals a method of producing a diffraction element, wherein a glass diffraction element is obtained relying upon the press-molding by using a set of molds including the mold CI or CII as an upper mold or as a lower mold.

BRIEF DESCRIPTION OF THE DRAWINGS

FIG. 1 is a sectional view schematically illustrating the steps for forming shaping portions for alignment mark transfer portions on a mold material of a first mold according to Example 1, wherein FIG. 1(a) is a sectional view schematically illustrating the mold material after having formed a resist film that is a material of resist pattern for dry-etching, FIG. 1(b) is a sectional view schematically illustrating the mold material after the resist pattern is formed, and FIG. 1(c) is a sectional view schematically illustrating the mold material after shaping portions are formed for forming the alignment mark transfer portions;

FIG. 7(a) is a plan view schematically illustrating a mold produced in Example 8 as viewed from the side where the alignment marks are formed, and FIG. 7(b) is a sectional view schematically illustrating the mold;

FIG. 8 is a sectional view schematically illustrating the steps for producing a first mold according to Example 12, wherein FIG. 8(a) is a sectional view schematically illustrating the mold material after having formed a resist film that is a material of resist pattern for dry-etching, FIG. 8(b) is a sectional view schematically illustrating the mold material after the resist pattern is formed, FIG. 8(c) is a sectional view schematically illustrating the mold material (base member) on which a transfer molding bare surface is formed, and FIG. 8(d) is a sectional view schematically illustrating a first mold that is produced;

DETAILED DESCRIPTION OF THE INVENTION

Figure 2A:
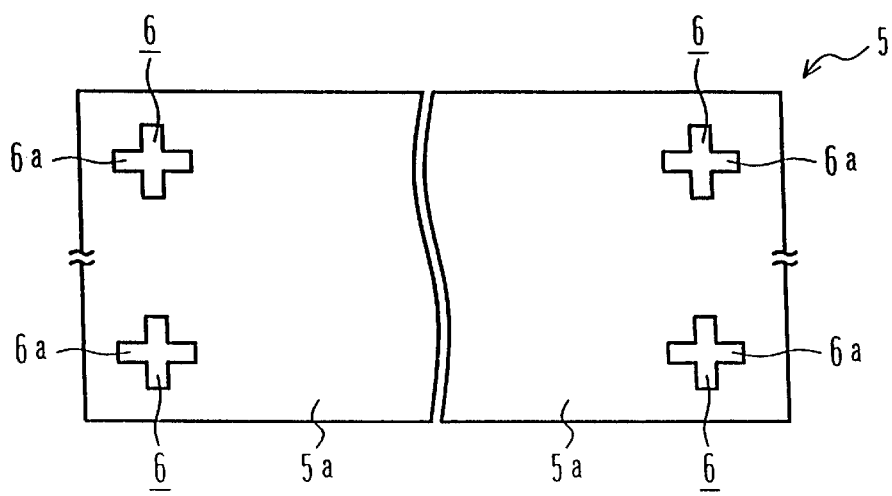
FIG. 2(a) is a plan view schematically illustrating the base member of the first mold produced in Example 1 as viewed from the side where the shaping portions are formed for forming the alignment mark transfer portions.

Described below in detail are aspects for carrying out the present invention.

First, the mold A of the invention will be described. As described earlier, the mold A has a transfer molding surface of a predetermined shape and is used for press-molding a shaping material into an optical element fixing member of a predetermined shape.

The optical element fixing member can be made of a glass, a resin or the like material. Therefore, the material of the mold A can be suitably changed depending upon the member that is to be obtained for fixing optical element(s) or, in other words, depending upon the temperature for press-molding, pressure for press-molding, etc.

It is desired that the optical element fixing member is made of a glass from the standpoint of obtaining, by press-molding, the optical element fixing member, which permits the dimensional accuracy and form accuracy to change little relative to a change in the ambient temperature and which exhibits a small difference in the thermal expansion from the optical element(s) that is/are to be fixed or mounted. It is particularly desired to use a glass which contains $SiO_2$, $B_2O_3$ and no as glass components. Concrete examples of the glass include the following (1) to (4).

(1) A glass containing, as glass components, 1 to 30% by weight of $SiO_2$, 15 to 40% by weight of $B_2O_3$, 40 to 60% by weight of ZnO (but 40% by weight is not included), 0 to 15% by weight of MgO, 0 to 10% by weight of CaO, 0 to 10% by weight of SrO, 0 to 10% by weight of BaO, 0 to 20% by weight of PbO, and 0 to 10% by weight of $Al_2O_3$ (but 0% by weight is not included), the sum of ZnO, MgO, CaO, SrO, BaO and PbO being 40 to 60% by weight (but 40% by weight is not included), and the sum of the glass components not being smaller than 75% by weight (this glass is hereinafter referred to as "first glass").

(2) A glass comprising the above first glass and 0 to 10% by weight of $GeO_2$ (but the sum of $SiO_2$ and $GeO_2$ is from 3 to 30% by weight), 0 to 20% by weight of $La_2O_3$, 0 to 10% by weight of $Y_2O_3$, 0 to 10% by weight of $Gd_2O_3$ (but the sum of $La_2O_3$, $Y_2O_3$ and $Gd_2O_3$ is from 0 to 20% by weight), 0 to 10% by weight of $Nb_2O_5$, 0 to 10% by weight of $Ta_2O_5$ (but the sum of $Nb_2O_5$ and $Ta_2O_5$ is from 0 to 10% by weight), 0 to 5% by weight of $ZrO_2$, and 0 to 3% by weight of $TiO_2$ (this glass is hereinafter referred to as "second glass").

(3) A glass comprising the first glass or the second glass to which are added one or more of $As_2O_3$, $Sb_2O_3$, SnO and $SnO_2$ as additive agent(s) in an attempt to improve degassing and decoloring (this glass is hereinafter referred to as "third glass").

(4) A glass comprising any one of the first glass to the third glass to which are further added F, $Bi_2O_3$, $Yb_2O_3$, $WO_3$, $Na_2O$, $K_2O$ etc. in amounts which do not adversely affect the properties of the glass.

As the material of the mold A for obtaining, by press-molding, the optical element fixing member made of glass, there can be preferably used a hard material containing tungsten carbide (WC), a cermet containing titanium nitride (TiN), titanium carbide (TiC) or aluminum oxide ($Al_2O_3$), or those comprising silicon carbide (SiC) or amorphous carbon. It is desired that the cermet described above contains TiN, TiC or $Al_2O_3$ in an amount of roughly not smaller than 90% by weight.

When it is attempted to obtain the mold A for producing the optical element fixing member made of glass by using the mold material comprising the above-mentioned hard material or cermet, it is desired that the predetermined surfaces of the mold material (hereinafter the mold material is referred to as "base member") after it is worked into a desired shape are coated with a mold release film, so that the surfaces of the mold release film serves as transfer molding surfaces, from the standpoint of preventing the melt-adhesion between the mold and the shaping material (glass) to be molded during the press-molding.

There can be used mold release films of various compositions depending upon the material of the base member and the composition of the shaping material. In order to prevent the melt-adhesion between the glass shaping material and the mold, however, the mold release film will be the one containing at least one component selected from the group consisting of Pt, Au, Ir, Pd and Rh, or the one comprising i-carbon. When it is attempted to obtain the mold A for producing the optical element fixing member made of glass by using the mold material comprising SiC or amorphous carbon, the mold release film may be formed or may not be formed.

The mold A of the present invention has alignment mark transfer portion(s) formed on the transfer molding surface thereof in order to obtain a molded article having alignment mark(s). The shape of the transfer molding surface excluding the alignment mark transfer portion(s) can be suitably selected depending upon the use of the optical element fixing member, that is to be obtained by using the mold A. It is obtained, for example, as a flat surface, as two or more flat surfaces the boundary thereof forming a step, a combination of flat surface(s) (above described one flat surface or above described two or more flat surfaces) and recessed portion(s) of a predetermined shape, a combination of flat surface(s) (above described one flat surface or above described two or more flat surfaces) and protruded portion(s) of a predetermined shape, or a combination of flat surface(s) (above described one flat surface or above described two or more flat surfaces), protruded portion(s) of a predetermined shape and recessed portion(s) of a predetermined shape.

On the other hand, the shape of the alignment mark transfer portion(s) as viewed on a plane is suitably selected depending upon the shape of the alignment mark(s) that are to be formed on the optical element fixing member. The number of the alignment mark transfer portion(s) formed on a transfer molding surface and the place(s) where the portion(s) is/are to be formed, are suitably selected depending upon the use of the optical element fixing member, that is to be obtained by using the mold, upon the shape and number of the optical element(s) that is/are to be fixed or mounted on the optical element fixing member, and upon the use of the alignment mark(s) on the optical element fixing member.

The alignment mark transfer portion may be formed in a protruded manner or in a recessed manner. When it is attempted to obtain the optical element fixing member for highly densely fixing or mounting the optical elements, however, it is desired that the alignment mark(s) formed on the optical element fixing member is/are also utilized as part of the region for fixing or mounting the optical elements. It is therefore desired that the alignment mark(s) is/are formed in a recessed manner so that the optical element(s) can be stably and easily fixed or mounted covering part or whole of the alignment mark(s). A desired member may also be placed on the optical element fixing member so that the optical element(s) can be fixed or mounted thereon more firmly. Even in this case, the member can be stably and easily placed provided the alignment mark(s) is/are formed in a recessed manner in the optical element fixing member.

Therefore, when it is attempted to obtain a optical element fixing member for highly densely fixing or mounting the optical element(s) or to obtain a optical element fixing member on which the member(s) can be placed in addition to the optical element(s), it is desired that the alignment mark transfer portion(s) is/are formed in a protruded manner on the mold A of the present invention.

Usually, a plurality of optical elements are fixed or mounted on the optical element fixing member. In order to optically connect these optical elements on the optical element fixing member by mechanically positioning these optical elements, it is necessary to position these optical elements in at least the two-dimensional directions. Moreover, even when the optical elements are optically connected together being fixed or mounted on the optical element fixing member by mechanically positioning the members on which the optical elements are fixed or mounted, it becomes necessary to position them in at least the two-dimensional directions.

It is therefore desired that the alignment mark transfer portion(s) have two or more straight portions like an L-shape, a crossed shape, a triangular frame shape or a rectangular frame shape as viewed on a plane, the straight portions subtending a predetermined angle relative to each other. The alignment mark formed by the alignment mark transfer portion having the above-mentioned shape, possess two or more straight portions which are subtending a predetermined angle relative to each other. It is therefore allowed to easily position the optical element(s) or the optical element fixing members in the two-dimensional directions.

When the mold A has a mold release film, the alignment mark transfer portion(s) is/are formed by shaping portion(s) to be coated with the mold release film and serve as the alignment mark transfer portion(s) (the shaping portion(s) is/are formed on the base member and are hereinafter simply referred to as "shaping portion") and by the mold release film covering the shaping portion(s). Or, the alignment mark transfer portion(s) is/are formed by the mold release film. When the mold does not have the mold release film, the alignment mark transfer portion(s) is/are formed on the mold material.

The shaping portion(s) can be formed on the mold material and the alignment mark transfer portion(s) can be formed on the mold material relying upon, for example, machine work or etching. In the case of the machine work, however, the tip of a cutting tool does not enter into a portion where straight protruded portions intersect each other, making it difficult to accurately form the alignment mark transfer portion(s) or the shaping portion(s) having intersecting portion(s). Moreover, when it is attempted to obtain the mold A having a step in the transfer molding surface (excluding the step between the alignment mark transfer portion and the surrounding thereof), it is not allowed to introduce the tip of the cutting tool for machine work near to the step in the region on the lower side divided by the step. Therefore, limitation is imposed on the region where the alignment mark transfer portion(s) or the shaping portion(s) can be formed by machine work. Furthermore, it is difficult to form, by wet etching, the highly precise alignment mark transfer portion(s) or the shaping portion(s) on the mold material composed of the above-mentioned hard material, cermet, SiC or amorphous carbon.

It is therefore desired to form, by dry etching, the molding portion(s) or the alignment mark transfer portion(s) on the mold material and, particularly, the molding portion(s) or the alignment mark transfer portion(s) having two or more straight portions which are subtending a predetermined angle relative to each other. The dry etching makes it possible to highly accurately form the shaping portion(s) or the alignment mark transfer portion(s) of a desired shape at any desired place.

From the standpoint of obtaining an optical element fixing member of which the alignment mark can be easily identified by eyes or by an image-recognizing device, it is desired that the alignment mark has a surface roughness which is different from the surface roughness of the periphery of the alignment mark. In the mold A, too, therefore, it is desired that the alignment mark transfer portion(s) have a surface roughness which is different from the surface roughness of the transfer molding surface in the periphery of the alignment mark transfer portion(s). By using the mold A in which a maximum surface roughness of the alignment mark transfer portion(s) is different by roughly more than 200 angstroms from a maximum surface roughness on the transfer molding surface in the periphery of the alignment mark transfer portion(s), it is allowed to obtain, by press-molding, the optical element fixing member of which the alignment mark(s) can be easily identified by eyes or by an image-recognizing device even when, for example, a transparent glass is used as a shaping material.

The mold A of the present invention described above has the alignment mark transfer portion(s) as described above. Therefore, the molds A of the present invention may be combined together, or the mold A of the present invention may be combined with a conventional mold to constitute a set of molds necessary for press-molding (inclusive of those constituted by an upper mold and a lower mold, or constituted by an upper mold, a lower mold and a sleeve mold. Include a set of molds in which the lower mold or the upper mold is a flat plate), and the shaping material is press-molded by using the set of molds thereby to obtain an optical element fixing member and having alignment mark(s). Here, the molds constituting the set of molds may be made of the same material or different materials. Moreover, the molds constituting the set of molds may or may not have a mold release film.

The optical element fixing member will assume a variety of shapes depending upon the applications, such as flat plate, plate having one or more steps, etc. Therefore, the shape of the molds (shape of the transfer molding surface of each mold) constituting the set of molds is so selected as to obtain a optical element fixing member of a desired shape.

The optical element fixing member obtained by press-molding by using the mold A of the present invention has predetermined alignment mark(s) formed thereon. When a plurality of optical elements are to be fixed or mounted on the optical element fixing member, therefore, the optical elements are positioned by utilizing the alignment mark(s). Thus, the optical elements are optically connected together relying upon the positioning only, or the optical elements are nearly optically connected together relying upon the positioning. Therefore, the optical interconnection can be accomplished within a short period of time even when a highly precise optical interconnection is carried out in a subsequent step relying upon the active alignment. Similarly, even when the optical elements are to be optically connected together between the optical element fixing members on which the optical elements have been fixed or mounted, these optical element fixing members are positioned by utilizing the alignment marks formed on the optical element fixing members, in order to accomplish the optical interconnection within a short period of time.

By using the above-mentioned optical element fixing member, therefore, the optical element(s) that is/are to be fixed or mounted can be optically connected together or the optical elements can be optically connected together between the optical element fixing members on which the optical elements have been fixed or mounted within a period of time shorter than that of when the optical interconnection between the optical elements is accomplished relying upon the active alignment only. Moreover, the optical interconnection can be automatically and easily accomplished.

The mold A of the present invention for obtaining the optical element fixing member having the above-mentioned advantages, can be produced by the method aI or the method aII of the present invention that will be described below.

As described earlier, the method aI of the present invention is to produce a mold (the above-mentioned mold A of the present invention) having a transfer molding surface of a predetermined shape and is used for press-molding a shaping material into an optical element fixing member, wherein shaping portion(s) for forming alignment mark transfer portion(s) is/are formed by dry-etching on the mold material so that the alignment mark transfer portion(s) is/are formed on the transfer molding surface of the mold for obtaining an optical element fixing member and the alignment mark(s), a mold release film is formed so that the shaping portion(s) is/are covered and that the surface of the mold release film serves as the transfer molding surface, thereby to obtain a mold having the alignment mark transfer portion(s) which comprise the shaping portion(s) and the mold release film covering the surfaces of the shaping portion(s), the surface of the mold release film serving as the transfer molding surface.

This method aI is to obtain the mold A in which a predetermined surface of the mold material (base member) worked into a desired shape is coated with the mold release film, and the surface of the mold release film serves as the transfer molding surface (alignment mark transfer portion(s) is/are formed on the transfer molding surface). When the mold A for press-molding a glass molded article (optical element fixing member) is to be produced by the method aI, therefore, it is desired to use an hard material or cermet (described already concerning the mold A of the invention) as a material of the mold A. It is also allowable to use a mold material such as Sic or amorphous carbon, as a matter of course.

In order to form the shaping portion(s) for forming the alignment mark transfer portion(s) on the mold material by dry-etching, at least portion where the shaping portion(s) is/are to be formed are formed flat on the surface of the mold material, a resist pattern of a desired shape is formed on the flat surface, and the dry-etching is effected by using the resist pattern as a mask.

The shape as viewed on a plane and the number of the alignment mark transfer portions and the portions where they are to be formed, are suitably selected depending upon the use of the optical element fixing member that is obtained by using the mold A as described already in the description of the mold A of the invention. Therefore, such requirements are suitably selected depending upon the use of the optical element fixing member that is obtained by using the mold A.

Similarly, furthermore, the shape of the portion (hereinafter referred to as "peripheral portion") on the transfer molding surface other than the alignment mark transfer portion(s), is suitably selected depending upon the use of the optical element fixing member obtained by using the mold A. Therefore, the shape of the surface of the mold material of the peripheral portion on where the mold release film will be formed, is suitably selected depending upon the use of the optical element fixing member that is obtained by using the mold A.

In obtaining the mold A according to the method aI, therefore, the portion which will become the peripheral portion on the surface of the mold material is worked into a desired shape in advance to obtain a base member of the desired shape in addition to forming the shaping portion(s) for forming the alignment mark transfer portion(s) by dry-etching prior to forming the mold release film. The shaping portion(s) may be formed by dry-etching simultaneously with, or separately from, the portion that will become the peripheral portion on the surface of the mold material. On the surface of the mold material, the portion which will become the peripheral portion can be formed by dry-etching or by machine work depending upon the shape thereof, or can be formed by dry-etching and machine work in combination.

It is desired that the alignment mark transfer portion(s) is/are formed as accurately as possible. For this purpose, it is desired to form the shaping portion(s) for forming the alignment mark transfer portion(s) as accurately as possible. From the standpoint of forming the shaping portion(s) as accurately as possible, the dry-etching conditions are suitably selected depending upon the mold material. When the mold material is the above-mentioned hard material or cermet, it is desired to use, as a dry-etching gas, one or more kinds of gases selected from the group consisting of a rare gas (Ar gas or the like gas), a simple gas of the carbon fluoride type ($CF_4$ gas or the like gas) and a simple gas of the chlorine type ($Cl_2$ gas or the like gas). When the mold material comprises SiC or amorphous carbon, furthermore, it is desired to use the above-mentioned rare gas, simple gas of the carbon fluoride type or simple gas of the chlorine type as the dry-etching gas.

As the mold release film formed on the base member so as to cover the shaping portion(s) formed by dry-etching and so as to serve as the transfer molding surface, there can be used those of a variety of compositions depending upon the base member and the shaping material as described earlier concerning the mold A of the invention. The mold release film can be formed by, for example, sputtering method, ion-plating method or CVD method.

From the standpoint of obtaining an optical element fixing member which enables the alignment mark(s) to be easily identified by eyes or an image-recognizing device, it is desired that the alignment mark transfer portion(s) have a surface roughness different from the surface roughness on the transfer molding surface in the periphery of the alignment mark transfer portion(s) as described above. In the mold A produced by the method aI, the surface of the mold release film serves as the transfer molding surface. The surface roughness of the mold release film changes depending upon the conditions for forming the mold release film, surface roughness on the surface of the mold material on where the mold release film will be formed, thickness of the mold release film, etc.

Therefore, when it is attempted to obtain, by the method aI, the mold in which the alignment mark transfer portion(s) have a surface roughness different from a surface roughness on the transfer molding surface (peripheral portion) on the periphery of the alignment mark transfer portion(s), it is recommended to suitably select the conditions for forming the mold release film, surface roughness on the surface of the mold material on where the mold release film will be molded, and thickness of the mold release film. In practice, however, it is desired that the mold release film has a thickness which is not less than about 0.03 $\mu$m at the smallest.

According to the above-mentioned method aI of the present invention, the shaping portion(s) for forming the alignment mark transfer portion(s) is/are formed by dry-etching. Therefore, even when the mold is made of the hard material, cermet, silicon carbide (SiC) or amorphous carbon, it is allowed to form at desired place(s) the shaping portion (s) (for forming alignment mark transfer portion(s)) maintaining a accuracy higher than that accomplished by the machine work or wet-etching. It is thus made possible to obtain a mold A capable of forming an optical element fixing member and having highly accurately formed alignment mark(s).

The method aII of the invention will now be described.

The method aII of the present invention is for producing a mold having a transfer molding surface of a predetermined shape and is used for press-molding a shaping material into an optical element fixing member, wherein alignment mark transfer portion(s) is/are formed by dry etching on the mold material so as to be positioned on the transfer molding surface of the mold in order to obtain an optical element fixing member and having the alignment mark(s).

The method aII is to obtain a desired mold by forming the alignment mark transfer portion(s) on the mold material. When it is attempted to produce the mold A for press-molding a glass molded article (optical element fixing member) by the method aII, it is desired to use SiC or amorphous carbon as a material for producing the mold A. It is also allowable to use the above-mentioned hard material or cermet as a material of the mold.

The alignment mark transfer portion(s) can be formed on the mold material by dry-etching in the same manner as that of forming "shaping portion(s) for forming the alignment mark transfer portion(s)" by the above-mentioned method aI.

The alignment mark transfer portion(s) may be so formed as will be positioned on the transfer molding surface of the mold A. As described already concerning the mold A of the invention, the shape as viewed on a plane and the number of the alignment mark transfer portion(s), place(s) where the portion(s) is/are to be formed, and the shape of the transfer molding surface other than the alignment mark transfer portion(s), are suitably selected depending upon the use of the optical element fixing member that is obtained by using the mold A.

Accordingly, the alignment mark transfer portion(s) and the transfer molding surface other than the alignment mark transfer portion(s) may be formed by dry-etching either simultaneously or separately. The transfer molding surface other than the alignment mark transfer portion(s) can be formed depending upon its shape by either dry-etching or machine work, or by dry-etching and machine work in combination.

It is desired that the alignment mark transfer portion(s) is/are formed as accurately as possible. For this purpose, the etching conditions are suitably selected depending upon the material of the mold.

From the standpoint of obtaining an optical element fixing member which enables the alignment mark to be easily identified by eyes or by an image-recognizing device, it is desired that the alignment mark transfer portion have a surface roughness different from a surface roughness on the transfer molding surface in the periphery of the alignment mark transfer portions as described above. In order to obtain such a mold A, therefore, it is desired to adjust, in advance, the surface roughness of the place(s) where at least the alignment mark transfer portion(s) is/are to be formed on the surface of the mold material while taking into consideration the dry-etching conditions at the time of forming the alignment mark transfer portion(s), material of the mold, and method of forming the transfer molding surface other than the alignment mark transfer portion(s).

According to the above-mentioned method all of the present invention, the alignment mark(s) is/are formed by dry-etching. Therefore, even when the mold is made of the hard material, cermet, silicon carbide (SiC) or amorphous carbon, it is allowed to form alignment mark(s) on desired place(s) maintaining accuracy higher than that accomplished by the machine work or wet-etching as described already concerning the mold A of the present invention. It is thus made possible to obtain the mold A capable of producing an optical element fixing member and having alignment mark(s) maintaining a high accuracy.

Next, described below is the optical element fixing member of the present invention.

As described earlier, the optical element fixing member of the present invention is a molded article on which are integrally molded alignment mark(s) for determining a positional relationship relative to other members, and has a feature in that the alignment mark(s) have a surface roughness different from a surface roughness on the periphery of the alignment mark(s).

The shape of the alignment mark(s) as viewed on a plane can be suitably selected depending upon the use, and the number of the alignment mark and place where the alignment mark is to be formed can be suitably selected depending upon the use of the optical element fixing member, and the shape and the number of the optical element(s) that is/are to be fixed or mounted on the optical element fixing member or on the use of the alignment mark(s) molded on the optical element fixing member. The alignment mark(s) may be formed in a protruded manner or in a recessed manner. As described already concerning the mold A of the present invention, however, it is desired that the alignment mark(s) is/are formed in a recessed manner from the standpoint of obtaining the optical element fixing member for fixing or mounting the optical element(s) highly densely or of obtaining the optical element fixing member, which permits member(s) other than the optical element(s) to be placed thereon.

From the standpoint of optically connecting the optical elements that are to be fixed or mounted, or of optically connecting the optical elements between the optical element fixing members on which the optical elements have been fixed or mounted, it is desired that the alignment mark has two or more straight portions such as of an L-shape, a crossed shape, a triangular frame shape or a rectangular frame shape as viewed on a plane, the straight portions subtending a predetermined angle.

Though there is no particular limitation on the surface roughness of the alignment mark, it is desired that a maximum surface roughness of the alignment mark is different by roughly more than 200 angstroms from a maximum surface roughness of the periphery of the alignment mark, so that the alignment mark can be easily identified by eyes or by an image-recognizing device.

The optical element fixing member of the present invention having the above-mentioned alignment mark(s) is made of an inorganic material or an organic material that can be press-molded, such as glass, resin or the like. As described already concerning the mold A of the present invention, it is desired that the optical element fixing member is made of a glass so that it exhibits a small change in the dimensional accuracy and form accuracy relative to a change in the ambient temperature and that it exhibits a small difference in the thermal expansion from the optical element(s) that are to be fixed or mounted. When the optical element fixing member of the present invention is made of a transparent material, furthermore, the alignment mark(s) formed on the optical element fixing member can be identified from various directions, offering advantages (A) and (B) as described below compared with when it is made of an opaque material or a translucent material.

(A) The opaque optical element(s) can be fixed or mounted so as to cover the alignment mark(s) while identifying the alignment mark(s) from the side surface or back surface (the surface of the side opposite to the surface on where the optical element(s) is/are to be fixed or mounted, the same holds hereinafter) of the optical element fixing member. Or, in other words, the alignment mark(s) can be utilized as part of the region for fixing or mounting the opaque optical element(s), making it possible to highly densely and easily secure or mount the optical elements.

(B) The alignment mark(s) can be identified from the side surface or back surface of the optical element fixing member even when another member is fixed or mounted thereon in order to further firmly secure the optical element(s). Therefore, despite the optical element(s) and the above-mentioned another member are made of opaque materials, the alignment marks formed in the optical element fixing members can be utilized at the time of optically connecting the desired optical elements between the optical element fixing member and another optical element fixing member (on which the optical element(s) have been fixed or mounted).

The above-mentioned optical element fixing member of the present invention has alignment mark(s) as described above. When a plurality of optical elements are to be fixed or mounted on the optical element fixing member, therefore, the optical elements are positioned by utilizing the above-mentioned alignment mark(s), making it possible to optically connect the optical elements relying upon the positioning only or to nearly optically connect the optical elements relying upon the positioning. Therefore, the optical interconnection can be accomplished within a short period of time even when a more precise optical interconnection is effected in a subsequent step relying on the active alignment. Similarly, even when the optical elements are to be optically connected between the optical element fixing members on which the optical elements have been fixed or mounted, the optical element fixing members are positioned by utilizing the alignment marks formed in the optical element fixing members, in order to shorten the time needed for the optical interconnection.

That is, by using an optical element fixing member of the present invention, the optical elements to be fixed or mounted can be optically connected, or the optical elements can be optically connected between the optical element fixing members on which the optical elements have been fixed or mounted, requiring a period of time shorter than that of when the optical interconnection is accomplished relying upon the active alignment only. Moreover, the optical interconnection can be automatically and easily accomplished. Furthermore, the optical element fixing member of the present invention can be obtained in large quantity and cheaply through press-molding that will be described later.

The shape of the optical element fixing member of the present invention as a whole can be suitably selected depending upon its use, such as flat plate or a plate having one or more steps (excluding a step between the alignment mark(s) and the periphery thereof).

The optical element fixing member of the present invention having the above-mentioned advantages can be obtained by press-molding by using a mold exemplified as one of the preferred molds A of the present invention, i.e., by using a set of molds (including the one constituted by an upper mold and a lower mold, the one constituted by an upper mold, a lower mold and a sleeve mold, and the one in which a lower mold or an upper mold is a flat plate) which is a combination of the mold A in which the surface roughness of the alignment mark transfer portion(s) is different from the surface roughness on the transfer molding surface in the periphery of the alignment mark transfer portion(s) and other mold(s) (mold A of the invention or a conventional mold).

In effecting the press-molding, it is desired to use a shaping material (shaping preform) to be molded having a shape, as viewed on a plane, which is close to the shape of the optical element fixing member as viewed on a plane. As the material to be molded, there is used any desired inorganic material or organic material that can be press-molded, such as glass, resin or the like. It is desired to use a glass as the material to be molded from the standpoint of obtaining an optical element fixing member, that exhibits a small difference in the thermal expansion from the optical element(s) that is/are to be fixed or mounted. As the glass that makes it possible to obtain a press-molded article and to obtain an optical element fixing member having the above-mentioned properties, there can be exemplified those described earlier concerning the mold A of the invention.

Described below next is the method bI of the present invention.

As described above, the method bI of the present invention is for easily producing a mold for press-molding having a highly accurately formed transfer molding-surface constituted by a plurality of transfer patterns. According to this method bI, first, alignment mark(s) are formed on the mold material by dry-etching.

The material of the mold can be suitably selected depending upon the material of the article that is to be press-molded or, in other words, depending upon the press-molding temperature and the press-molding pressure. As the material of the article that is to be press-molded (shaping material), there have been known a glass, a resin and the like. It is, however, desired to use a glass as a shaping material for molding the optical element fixing member from the standpoint of obtaining, by press-molding, the optical element fixing member exhibiting a small change in the dimensional accuracy and in the form accuracy relative to a change in the ambient temperature and a small difference in the thermal expansion from the optical element(s) that is/are to be fixed or mounted.

As the mold material for obtaining, by press-molding, a optical element fixing member made of glass, there can be preferably used the hard material, cermet, silicon carbide (SiC) or amorphous carbon that were exemplified above as the materials of the mold A of the present invention.

Here, the method bI is for obtaining a desired mold while forming a transfer molding surface on the mold material. When it is attempted to produce a mold for obtaining a molded article of glass relying upon the method bI, therefore, it is desired to use SiC or amorphous carbon as the mold material.

The alignment mark(s) can be formed on the mold material by dry-etching in the same manner as the formation of the "shaping portion(s) for forming the alignment mark transfer portion(s)" by the above-mentioned method aI or in the same manner as the formation of the "alignment mark transfer portion(s)" by the above-mentioned method aII. In this case, it is desired that the alignment mark(s) is/are formed as accurately as possible. For this purpose, the dry-etching conditions are suitably selected depending upon the material of the mold.

From the standpoint of easily identifying the alignment mark(s) by eyes or an image-recognizing device, furthermore, it is desired that the surface roughness of the alignment mark(s) is set to be different from the surface roughness on the periphery of the alignment mark(s) in the same manner as done in the above-mentioned methods aI and aII.

The shape of the alignment mark(s) can be suitably selected as viewed on a plane, and the alignment mark(s) may be formed in a protruded manner or in a recessed manner. Moreover, the number of the alignment mark(s) and the place(s) where the alignment mark(s) is/are to be formed are suitably selected depending upon the shape of the transfer patterns to be formed on the transfer molding surface in the mold or the upon the use of the mold.

For example, when it is desired to obtain a mold in which a plurality of transfer patterns of a recessed shape or a protruded shape are highly accurately arranged in the two-dimensional directions, it is desired that the alignment mark(s) have two or more straight portions like that of an L-shape, a crossed shape, a triangular frame shape or a rectangular frame shape as viewed on a plane, and that these straight portions are formed subtending a predetermined angle. By using the alignment mark(s) having the above-mentioned shape, it becomes easy to form a transfer molding surface on which a plurality of transfer patterns of a recessed shape or a protruded shape are highly accurately arranged in the two-dimensional directions.

Upon so forming the alignment mark(s) as to be located on the transfer molding surface, then, the alignment mark(s) work as "shaping portion(s) for forming the alignment mark transfer portion(s)" referred to in the mold A of the present invention. It is therefore allowed to obtain a molded article having alignment mark(s) of a shape corresponding to the above-mentioned alignment mark(s), e.g., to obtain the above-mentioned optical element fixing member of the present invention.

In the method bI of the present invention, the alignment mark(s) is/are formed by dry-etching and, then, the mold material is worked with the alignment mark(s) as a reference thereby to form the transfer molding surface constituted by a plurality of transfer patterns.

Each shape of the transfer patterns is suitably selected depending upon the shape of the molded article that is to be obtained by using the mold produced according to the method bI, and may have a plane shape, a predetermined recessed shape or a predetermined protruded shape. Similarly, the combination of transfer patterns for constituting the transfer molding surface can be suitably selected depending upon the shape of the molded article that is to be obtained by using the mold produced by the method bI. Examples include a combination of two or more flat surfaces in which the boundary portion is forming a step, a combination of flat surface(s) (one flat surface or above described two or more flat surfaces) and predetermined recessed shape(s), a combination of flat surface(s) (one flat surface or above described two or more flat surfaces) and predetermined protruded shape(s), and a combination of flat surface(s) (one flat surface or above described two or more flat surfaces), predetermined protruded shape(s) and predetermined recessed shape(s).

When an alignment mark is so formed as will be located on the transfer molding surface, "the transfer molding surface constituted by a plurality of transfer patterns" referred to by the method bI of the present invention stands for the one having a total of three or more transfer patterns inclusive of the alignment mark.

The alignment mark(s) that is/are to be located on the transfer molding surface, is/are formed by dry-etching as described above. Here, however, no particular limitation is imposed on the method of forming other transfer patterns; i.e., etching method (dry-etching method or wet-etching method), grinding method, a combination of etching method and grinding method or the like method can be suitably selected depending upon the shape of the other transfer patterns. Even when the alignment mark(s) is/are not positioned on the transfer molding surface, no particular limitation is imposed on the method of forming the transfer patterns; i.e., etching method (dry-etching method or wet-etching method), grinding method, a combination of etching method and grinding method or the like method can be suitably selected depending upon the shape of the transfer patterns.

When the above-mentioned alignment mark(s) is/are to be located on the transfer molding surface, other transfer patterns may all be formed at the time of forming the alignment mark(s), or some of the other transfer patterns may be formed at the time of forming the alignment mark(s) and the remainder of the transfer pattern(s) may be formed after the alignment mark(s) have been formed, or other transfer patterns may all be formed after the alignment mark(s) have been formed, depending upon the shape of the transfer patterns other than the alignment marks.

According to the above-mentioned method bI of the present invention, the alignment mark(s) is/are formed on the mold material by dry-etching. Therefore, even when the mold material is made of the hard material, cermet, silicon carbide (SiC) or amorphous carbon, there are obtained alignment mark(s) maintaining a accuracy higher than that accomplished by the grinding work or the wet-etching. By using the alignment mark(s) as a reference, a predetermined molding surface is formed on the mold material, i.e., the transfer molding surface constituted by a plurality of transfer patterns is formed, making it easy to produce the mold having a highly accurately formed transfer molding surface constituted by a plurality of transfer patterns.

The mold produced by the method bI having the above-mentioned advantages is used in combination with other mold(s) produced by the method bI or in combination with mold(s) produced according to a conventional method, so that there is obtained a set of molds (including the one constituted by an upper mold and a lower mold, the one constituted by an upper mold, a lower mold and a sleeve mold, an the one in which a lower mold or an upper mold is a flat plate) necessary for the press-molding.

Described below is the method bII of the present invention.

The method bII of the present invention is for easily producing a mold for press-molding, having a highly accurately formed transfer molding surface constituted by a plurality of transfer patterns like that of the method bI. According to this method bII as described above, alignment mark(s) is/are formed by dry-etching on the mold material, and the mold material is worked with the alignment mark(s) as a reference, thereby to form a transfer molding bare surface constituted by bare transfer patterns that serve as bases for the transfer patterns. Then, the mold release film is formed so as to cover at least the transfer molding bare surface, thereby to obtain a mold in which the surface of the mold release film serves as a transfer molding surface.

According to this method bII as described above, the predetermined surface of the mold material after it is worked into a desired shape is coated with the mold release film to obtain the mold in which the surface of the mold release film serves as the transfer molding surface. When the mold for press-molding a glass molded article is to be obtained by the method bII, therefore, it is desired that the mold is made of the hard material or cermet as described concerning the mold A of the present invention. Even in this case, it is allowed to use the mold material of silicon carbide (SiC) or amorphous carbon.

The alignment mark(s) according to the method bII is/are formed quite in the same manner as the formation of the alignment mark(s) according to the above-mentioned method bI, and the transfer molding bare surface according to the method bII is formed quite in the same manner as the formation of the transfer molding surface according to the above-mentioned method bI. Therefore, their description is not repeated here.

The mold release film formed by the method bII is to prevent the melt-adhesion between the mold and the shaping material during the press-molding. Therefore, the material of the mold release film is suitably selected depending upon the material of the mold that is to be produced by the method bII and the material of the molded article (shaping material that is to be molded) press-molded by using the mold. For example, when the material such as the hard material or cermet is used to obtain the mold for producing press-molded glass articles, there is used, as the mold release film, a film containing at least one component selected from the group consisting of Pt, Au, Ir, Pd and Rh, or a film of i-carbon.

The thickness of the mold release film can be suitably selected depending upon the use of the mold that is produced, the transfer patterns constituting the transfer molding bare surface and the material of the mold release film, in order to prevent the melt-adhesion between the mold and the shaping material, and so that the bare transfer patterns constituting the transfer molding bare surface will not be erased by the mold release film formed on the transfer molding bare surface. The mold release film is formed by, for example, sputtering method, ion-plating method, CVD method or the like method by taking into consideration the material, use of the mold that is obtained, productivity, etc.

In the above-mentioned method bII of the present invention, too, alignment mark(s) is/are formed by dry-etching on the mold material in the same manner as in the method bI of the present invention. Therefore, even when the mold material is made of a material such as hard material, cermet, silicon carbide (SiC) or amorphous carbon, there is/are formed the alignment mark(s) maintaining accuracy higher than that accomplished by the grinding work or the wet-etching. Based upon the alignment mark(s), a predetermined transfer molding bare surface is formed on the mold material, i.e., a transfer molding bare surface constituted by a plurality of bare transfer patterns is formed and, then, the mold release film is formed so as to at least cover the transfer molding bare surface, thereby to obtain a mold in which the surface of the mold release film serves as the transfer molding surface. It is thus made possible to easily produce the mold having a highly accurately formed transfer molding surface constituted by a plurality of transfer patterns.

The mold produced by the method bII having the above-mentioned advantage is used in the same manner as the mold produced by the above-mentioned method bI.

Next, described below is the mold CI of the present invention.

As described earlier, the mold CI of the present invention is for press-molding and has transfer pattern(s) of a predetermined shape and of a high accuracy, exhibiting a long life. The mold CI comprises a base member having a transfer molding bare surface of a predetermined shape formed by dry-etching, and a mold release film formed on the transfer molding bare surface so as to reflect the shape of the transfer molding bare surface.

The base member is obtained by forming the transfer molding bare surface on the mold material of a desired shape. As the material of the base member, there can be used the hard material, cermet, silicon carbide or amorphous carbon exemplified with reference to the mold A of the present invention from the standpoint of obtaining the mold that features the transfer patterns of a long life. Among them, it is desired to use the hard material or cermet.

The transfer molding bare surface formed on the base member constitutes transfer pattern(s) together with the mold release film that will be described later. Therefore, the shape of the transfer molding bare surface is suitably selected depending upon the shape of the article that is to be press-molded by using the mold CI. When the article to be press-molded is a diffraction element, the shape is suitably selected depending upon the shape of the surface of the diffraction element, shape of the grooves in the diffraction element, number or density of the grooves, area of the gradations, and the like.

As described above, the transfer molding bare surface is formed by dry-etching. Whether the transfer molding bare surface is formed by dry-etching or grinding work, can be judged depending upon whether there is a trace of grinding or polishing on the transfer molding bare surface. Presence of the trace of grinding or polishing indicates that it was formed by grinding work. Whether the transfer molding bare surface is formed by dry-etching or wet-etching can be determined depending upon the angle subtended by the side surface at the base portion of the pattern formed by etching and by the surface of the mold material (excluding the surface of the pattern). When the angle is sharply rising at about 90°, then, it is formed by dry-etching.

Relying upon the dry-etching, it is allowed to highly accurately form the transfer molding bare surface of a desired shape regardless of whether the mold material is made of the hard material, cermet, SiC or amorphous carbon.

In the mold CI, the mold release film is formed on the transfer molding bare surface so as to reflect the shape of the transfer molding bare surface, and the surface of the mold release film serves as the transfer molding surface. That is, in the mold CI, the transfer patterns are constituted by the transfer molding bare surface formed on the base member and the mold release film formed on the transfer molding bare surface.

The mold release film is to prevent the melt-adhesion between the mold CI and the shaping material to be molded (shaping preform) during the press-molding. The mold release film of various compositions can be used depending upon the material of the base member and the composition of the shaping material that is to be molded. As the mold release film for preventing the melt-adhesion between the mold CI and the glass shaping material, there can be used a film containing at least one component selected from the group consisting of Pt, Au, Ir, Pd and Rh, or a film of i-carbon.

The thickness of the mold release film is suitably selected depending upon the use of the mold that is obtained, shape of the transfer molding bare surface, material of the mold release film and shape of the desired transfer patterns, in order to prevent the melt-adhesion between the mold and the shaping material that is to be molded, and so that the shape of the transfer molding bare surface is reflected on the mold release film. In practice, however, it is desired that the thickness of the mold release film is not less than roughly 0.03 μm at the smallest.

The mold CI of the present invention equipped with the above-mentioned base member and the mold release film, is combined with predetermined mold(s) thereby to constitute a set of molds (including the one constituted by an upper mold and a lower mold, the one constituted by an upper mold, a lower mold and a sleeve mold, and the one of which a lower mold or an upper mold is a flat plate) which is necessary for obtaining a desired molded article by press-molding.

In this case, the materials of the molds constituting the set of molds may be the same or different. Or, the molds constituting the set of molds may or may not have the mold release film, except the mold CI. Moreover, the shapes of the molds constituting the set of molds (shapes of transfer molding surfaces of the molds) are suitably selected depending upon the shape of the molded article that is to be obtained by press-molding. The diffraction element may have a surface shape, e.g., a flat shape, a concaved shape or a spherical shape depending upon its use. Therefore, the shapes of the molds constituting the set of molds (shapes of transfer molding surfaces of the molds) are suitably selected so that the diffraction element having a desired surface shape can be obtained.

In the mold CI of the present invention, the transfer molding bare surface has been formed on the base member, and the transfer patterns are constituted by the transfer molding bare surface and the mold release film formed on the transfer molding bare surface. Therefore, it is allowed to easily obtain a mold of which the transfer patterns feature an extended life compared with the conventional mold in which the transfer patterns are formed by patterning the thin film formed on the base member into a predetermined shape.

In the above-mentioned conventional mold, when a transfer pattern (thin film after patterned) is peeled off, the mold cannot be regenerated unless a predetermined thin film is formed after the transfer pattern that has peeled off (thin film after patterned) is removed, and the thin film is further patterned by the lithographic method or the like method. In the mold CI of the present invention, on the other hand, even when the mold release film constituting the mold CI has peeled off, the mold CI can be regenerated if the mold release film is simply formed after the mold release film that has peeled off is removed. In this case, no patterning based on the lithographic method is required and, hence, the mold is easily regenerated.

In the mold CI of the present invention, furthermore, the transfer molding bare surface is formed by dry-etching. This offers an increased degree of freedom of the transfer molding bare surface configuration for forming a mold and, hence, an increased degree of freedom of the transfer patterns configuration, making it possible to more easily form the transfer patterns maintaining high accuracy compared with the case where the transfer molding bare surface is formed by grinding the mold material.

The mold CI of the present invention having the above-mentioned advantages can be produced by, for example, the method cI of the present invention that will be described later.

Next, described below is the mold CII of the present invention.

Like the above-mentioned mold CI of the present invention, the mold CII of the present invention is for press-molding and has transfer patterns of a predetermined shape maintaining a high accuracy, exhibiting a long life. The feature resides that the transfer molding surface is formed on the mold material by dry-etching.

Unlike the above-mentioned mold CI, however, the mold CII has no mold release film. As the material of the mold CII, therefore, it is desired to use the one which does not melt-adhere to the shaping material (glass) during the press-molding and makes it possible to obtain a mold of which the transfer patterns (shape of the transfer molding surface) exhibit a long life. A concrete example of the material for obtaining such a mold will be amorphous carbon.

Since no mold release film is formed, the shape of the transfer molding surface of the mold CII is different from the shape of the transfer molding bare surface of the above-mentioned mold CI. Except this point, however, the mold CII is substantially the same as the mold CI produced by using a mold material (amorphous carbon) that does not require mold release film. Therefore, its description is not repeated here.

Like the above-mentioned mold CI, the mold CII of the present invention is used in combination with predetermined mold(s) to constitute a set of molds (including the one constituted by an upper mold and a lower mold, the one constituted by an upper mold, a lower mold and a sleeve mold, and the one of which a lower mold or an upper mold is a flat plate) that is necessary for the press-molding.

In the mold CII of the present invention, the transfer molding surface has been formed on the mold material. Therefore, it is allowed to easily obtain a mold of which the transfer patterns exhibit a long life compared with the conventional molds in which the thin film formed on the base member is patterned into a predetermined shape to form transfer patterns.

According to the mold CII of the present invention in which the transfer molding surface is formed by dry-etching, furthermore, there is obtained an increased degree of freedom of the transfer molding surface configuration for obtaining a mold and, hence, for forming transfer patterns of a high accuracy more easily than when the transfer molding surface is formed by .grinding the mold material.

The mold CII of the present invention having the above-mentioned advantage can be produced by, for example, the method cII of the present invention that will be described later.

Next, described below is the method cI of the present invention.

The above-mentioned method cI of the present invention obtains a mold by obtaining a base member by forming, on the mold material by dry-etching, the transfer molding bare surface that serves as a base for the transfer molding surface, and by forming the mold release film on the transfer molding bare surface so as to reflect the shape of the transfer molding bare surface, the surface of the mold release film serving as the transfer molding surface.

This method cI is to obtain the above-mentioned mold CI. As the mold material, therefore, it is desired to use the hard material or cermet (described above with reference to the mold CI), or SiC. It is allowable to use the amorphous carbon as a mold material, as a matter of course.

The transfer molding bare surface is formed on the mold material by dry-etching in the same manner as the formation of the "shaping portion(s) for forming the alignment mark transfer portion(s)" by the above-mentioned method aI or in the same manner as the formation of the "alignment mark transfer portion(s)" by the above-mentioned method aII. As described with reference to the mold CI, the shape of the transfer molding bare surface is suitably selected depending upon the shape of the molded article press-molded by using the mold CI. In this case, it is desired that the transfer molding bare surface is formed as accurately as possible. For this purpose, the dry-etching conditions are suitably selected depending upon the material of the mold.

As the mold release film formed on the transfer molding bare surface formed by dry-etching so as to reflect the shape of the transfer molding bare surface, there can be used those of a variety of compositions depending upon the material of the base member and the material of the mold. The thickness of the mold release film is suitably selected depending upon the use of the mold that is obtained, shape of the transfer molding bare surface, material of the mold release film and shape of the desired transfer patterns, so that there can be obtained desired transfer patterns reflecting the shape of the transfer molding bare surface, as described with reference to the mold CI. In practice, however, it is desired that the thickness of the mold release film is not less than about 0.03 $\mu$m at the smallest. The mold release film can be formed by, for example, sputtering method, ion-plating method, CVD method or the like method.

As described above, the mold release film is formed in order to obtain a desired mold CI.

According to the above-mentioned method cI of the present invention, the transfer molding bare surface is formed by dry-etching. This offers an increased degree of freedom of the transfer molding bare surface configuration and, hence, an increased degree of freedom of the transfer patterns configuration, making it possible to more easily form the transfer patterns maintaining high accuracy compared with the case where the transfer molding bare surface is formed by grinding the mold material.

Moreover, the base member is obtained by forming a transfer molding bare surface on the mold material, and the transfer patterns are constituted by the transfer molding bare surface and the mold release film formed on the transfer molding bare surface. Therefore, it is allowed to easily obtain a mold having transfer patterns which feature a long life compared with the conventional mold in which the same transfer patterns are formed by patterning a thin film formed on the base member into a predetermined shape.

Next, described below is the method cII of the present invention.

The method cII of the present invention is to obtain the mold by forming a transfer molding surface on the material of the mold by dry-etching as described above.

This method cII is to obtain the mold (above-mentioned mold CII of the present invention) by forming a transfer molding surface (transfer patterns) on the mold material, and it is desired to use the amorphous carbon as the mold material. It is allowable to use the above-mentioned hard material, cermet or SiC as the mold material as a matter of course.

The mold CII to be obtained by the method cII has no mold release film and, hence, has the transfer molding surface of a shape which is different from the shape of the transfer molding bare surface in the mold CI. Except this point, however, the transfer molding surface is formed by the method cII substantially in the same manner as the formation of the transfer molding bare surface at the time of producing the mold CI by the above-mentioned method cI by using the mold material (amorphous carbon) that requires no mold release film. Therefore, its description is not repeated here.

According to the above-mentioned method cII of the present invention, the transfer molding surface is formed by dry-etching. This offers an increased degree of freedom of the transfer molding surface configuration and, hence, an increased degree of freedom of the transfer patterns configuration, making it possible to more easily form the transfer patterns maintaining high accuracy compared with the case where the transfer molding surface is formed by grinding the mold material.

Moreover, the transfer molding surface (transfer patterns) is formed on the mold material. Therefore, it is allowed to easily obtain a mold having transfer patterns which feature a long life compared with the conventional mold in which the transfer patterns are formed by patterning a thin film formed on the base member into a predetermined shape.

Next, described below is the method of producing a diffraction element according to the present invention.

According to the method of the present invention as described earlier, a glass diffraction element is produced relying on the press-molding by using a set of molds including the mold CI or the mold CII of the invention as an upper mold or a lower mold.

Here, transfer patterns corresponding to rugged patterns necessary for creating the function of the diffraction element are formed in the mold CI or in the mold CII.

The set of molds (inclusive of the one constituted by an upper mold and a lower mold, the one constituted by an upper mold, a lower mold and a sleeve mold, and the one in which a lower mold or an upper mold is a flat plate) used by this method includes an upper mold or a lower mold which may be either the mold CI or the mold CII of the present invention. The shape of the molds (shape of the transfer molding surface in these molds) constituting the set of molds is suitably selected depending upon the shape of the diffraction element that is to be obtained. Moreover, the materials of the molds constituting the set of molds may be the same or different. Except the mold CI and the mold CII, furthermore, the molds constituting the set of molds may or may not have the mold release film.

The glass diffraction element can be produced in the same manner as the conventional method in addition to using the above-mentioned set of molds needed for the press-molding. That is, a glass shaping material (preform) to be molded having a desired composition is placed in a cavity formed by the set of molds, is heated up to a temperature at which it can be deformed, is compressed from a predetermined direction so that the surface shapes of the molds (shapes of the transfer molding surfaces of the molds) can be transferred onto the shaping material to be molded, is cooled and, then, a molded article is taken out from the cavity in the set of molds.

The method of producing the diffraction element of the present invention uses the above-mentioned mold CI or the mold CII of the present invention. These molds CI and CII have transfer patterns that feature a longer life than that of the conventional mold in which the transfer patterns are formed by patterning a thin film formed on the base member into a predetermined shape. Moreover, the molds CI and CII offer an increased degree of freedom of the transfer molding bare surface configuration or the transfer molding surface configuration, and make it possible to easily obtain transfer patterns having high accuracy compared with the conventional mold in which the transfer molding surface is formed by grinding the mold material.

According to the method of producing the diffraction element of the present invention, therefore, a glass diffraction element having a desired shape can be produced at a low cost.

The present invention will now be described in further detail by way of working examples to which only, however, the invention is in no way limited.

EXAMPLE 1

(1) Preparation of a First Mold by the Method aI.

First, a hard material containing WC is used as a mold material. The mold material has the shape of a flat plate measuring 20.0 mm long, 10.0 mm wide, 2.0 mm thick and having a maximum surface roughness of 100 angstroms. Next, a positive-type photo-resist (AZ1350 produced by Hoechst Co.) is applied by a spin-coating method onto one surface of the mold material to form a resist film 2 maintaining a thickness of 2.0 $\mu$m on one surface of the mold material 1 as shown in FIG. 1(*a*).

Next, a photomask of a predetermined shape is intimately adhered onto the resist film 2. The photomask is made of an ultraviolet ray-transmitting substrate of a rectangular shape measuring 20×10 mm as viewed on a plane, having cross-shaped light-shielding portions (10 $\mu$m long, 10 $\mu$m wide) of a Cr film having a line width of 3.0 $\mu$m at four corners of the substrate. The photomask is adhered onto the resist film 2 so that the light-shielding portions can be positioned on the side of the resist film 2. Then, the resist film 2 is exposed to ultraviolet ray (exposure of 25 mW/cm$^2$) from the side of the photomask, and is developed by being immersed in a predetermined developing solution (AZ developer solution produced by Hoechst Co.) for 90 seconds.

Through the developing, the exposed portions of the resist film 2 are dissolved and removed, and resist patterns 3 of a crossed shape constituted by the portions that are not exposed to light (portions that are not exposed to ultraviolet ray being interrupted by the light-shielding portions formed on the photomask) are formed at four corners on one surface of the mold material 1 as shown in FIG. 1(*b*).

The resist patterns 3 have a crossed shape measuring 10 μm long, 10 μm wide, having a line width of 3.0 μm as viewed on a plane, and having a thickness of 2.0 μm.

The resist patterns 3 are post-baked at 120° C. for 60 minutes. Then, by using these resist patterns 3 as masks, one surface of the mold material 1 is dry-etched for one minute. The dry-etching is effected by using a reactive etching apparatus of the type of Inductively Coupled Plasma, and a $Cl_2$ gas is used as an etching gas. The etching conditions consist of a coil bias of 600 W, a substrate bias of 300 W, an etching gas ($Cl_2$ gas) flow rate of 20.0 sccm, and a pressure of 5.0 mTorr.

Under the above-mentioned dry-etching conditions, the resist patterns 3 are etched at a rate of 0.14 μm/min, and the thickness thereof decreases down to 1.86 μm (hereinafter, the resist patterns 3 after dry-etching are referred to as "resist patterns 4", see FIG. 1(c)). Moreover, the surface of the mold material 1 of the side on where the resist patterns 3 are formed is etched at a rate of 0.03 μm/min except the portions that are protected by the resist patterns 3 (resist pattern 4). As a result as shown in FIG. 1(c), there are formed protruded portions 6 of a crossed shape which are 10 μm long, 10 μm wide, and 0.03 μm high, having a line width of 3.0 μm as viewed on a plane, at four corners on one surface of the mold material 1 (hereinafter referred to as "base member 5") after dry-etching. The protruded portions 6 are utilized as shaping portions for forming alignment mark transfer portions that will be described later and are hereinafter referred to as "shaping portions 6 for forming the alignment mark transfer portions".

Figure 2B:
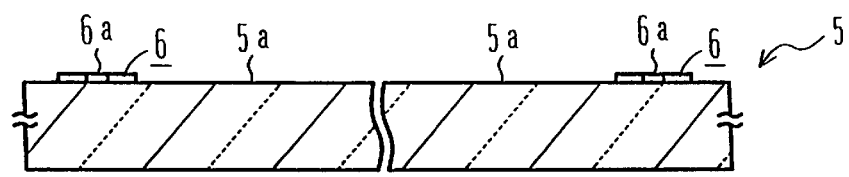
FIG. 2(b) is a sectional view schematically illustrating the base member.

Then, the resist patterns 4 are peeled off by using a predetermined peeling solution to obtain a base member 5 for forming a desired first mold. Referring to FIGS. 2(a) and 2(b), the shaping portions 6 for forming the alignment mark transfer portions are formed at four corners on one surface of the base member 5, and the upper surfaces 6a of the shaping portions 6 (upper surfaces in FIG. 2, the same holds in the following Examples 2 to 7) have a maximum surface roughness of 100 angstroms. The surface 5a of the base member 5 of the side where the shaping portions 6 are formed (excluding the portions where the shaping portions 6 are formed) is substantially flat and has a maximum surface roughness of 1000 angstroms.

Next, a mold release film comprising Au, Pt, Pd and Rh is formed maintaining a thickness of 1500 angstroms (on the surface 5a of the base member 5 and on the upper surfaces 6a of the shaping portions 6) on the whole outer surface of the base member 5 of the side where the shaping portions 6 are formed for forming the alignment mark transfer portions by using an RF sputtering apparatus. The sputtering is effected while adjusting the atmosphere gas (Ar gas) flow rate to be 20.0 sccm, the atmosphere pressure to be 1.0 Pa, and the RF bias to be 300 W.

Through the steps up to forming the mold release film, a desired first mold is obtained. This mold is one of the molds A of the present invention.

Figure 3A:
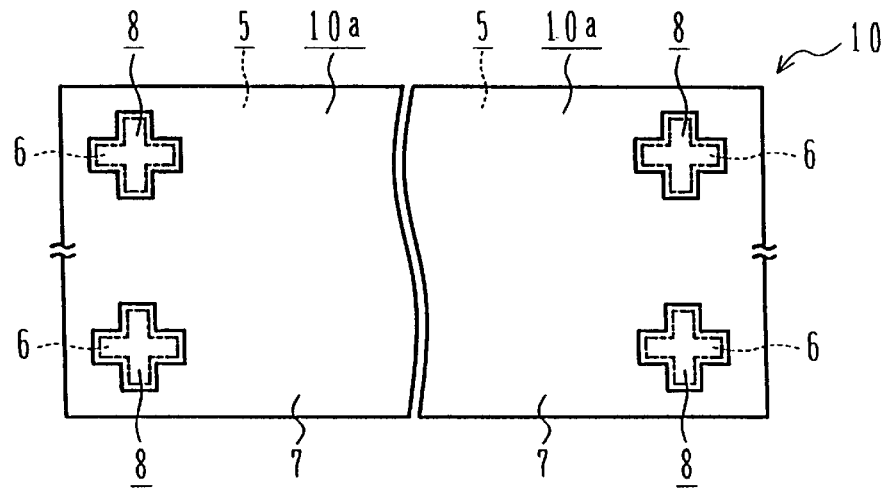
FIG. 3(a) is a plan view schematically illustrating the first mold produced in Example 1 as viewed from the side where the alignment mark transfer portions are formed.
Figure 3B:
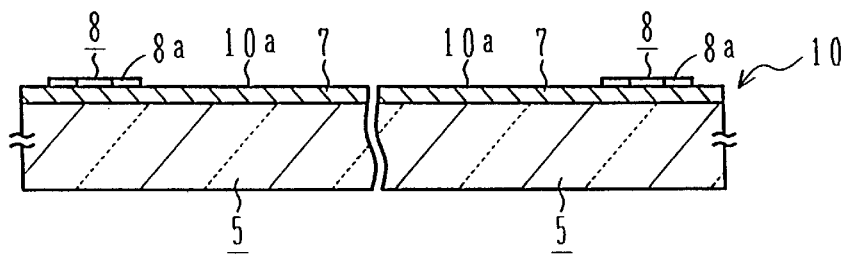
FIG. 3(b) is a sectional view schematically illustrating the first mold.

Referring to FIGS. 3(a) and 3(b), the first mold 10 comprises the base member 5, and the mold release film 7 formed on the whole outer surface of the base member 5 on the side where the shaping portions 6 are formed for forming the alignment mark transfer portions. In the first mold 10, the surface of the mold release film 7 is serving as a transfer molding surface 10a. On the transfer molding surface 10a, there are formed four alignment mark transfer portions 8 constituted by the shaping portions 6 for forming the alignment mark transfer portions and the portions of the mold release film covering the outer surfaces of the shaping portions 6.

The upper surfaces 8a of the alignment mark transfer portions (upper surfaces in FIG. 3(b), the same holds in the following Examples 2 to 7) have a maximum surface roughness of 100 angstroms. On the transfer molding surface 10a, the portion (peripheral portion) excluding the portions where the alignment mark transfer portions 8 are formed, is substantially flat and has a maximum surface roughness of 1000 angstroms.

(2) Preparation of a Second Mold.

A flat plate of a hard material containing WC and measuring 20 mm long, 10 mm wide, 2.0 mm thick and having a maximum surface roughness of 100 angstroms, is used as a base member for a second mold. Then, a mold release film comprising Au, Pt, Pd and Rh is formed maintaining a thickness of 1500 angstroms by sputtering on one surface of the base member under the conditions same as those of when the above-mentioned first mold is obtained. Upon forming the mold release film, a desired second mold is obtained.

In the above-mentioned second mold, the surface of the mold release film formed on one surface of the base member serves as a transfer molding surface.

Upon combining the above-mentioned first mold and the second mold, there is obtained a set of molds of the sidefree type consisting of these two molds.

(3) Preparation of a Third Mold.

A base member is obtained by cutting and polishing a block of a hard material containing WC into a cylinder of a predetermined size, and a mold release film comprising Au, Pt, Pd and Rh is formed maintaining a thickness of 1500 angstroms by sputtering on the inner surface of the base member under the conditions same as those of when the above-mentioned first mold is obtained, thereby to obtain a desired third mold. The third mold has an inner size which permits the above-mentioned first mold and the second mold to be inserted therein maintaining a predetermined clearance. In this mold, the surface of the mold release film formed on the inner surface of the base member serves as a transfer molding surface.

Upon combining the above-mentioned first mold, second mold and third mold, there is obtained a set of molds constituted by three molds, i.e., an upper mold (the first mold or the second mold), a lower mold (the second mold or the first mold), and a sleeve mold (the third mold).

(4) Press-molding.

First, a set of molds is constituted by using the first mold prepared in (1) above and the second mold prepared in (2) above, and the first mold is secured to an upper holder of a press molding machine in a manner that the transfer molding surface thereof becomes the lower surface, and the second mold is secured to a lower holder of the press molding machine in a manner that the transfer molding surface thereof becomes the upper surface. A preform of a soda lime glass measuring 20.0×10.0×2.0 mm is placed on the lower mold (the second mold), and the press-molding is effected in vacuum under the conditions of an upper mold (the first mold) temperature of 660° C., a lower mold (the second mold) temperature of 630° C., a pressing force of 170 kg/cm², and a pressing time of 120 seconds, in order to obtain a rectangular plate-like optical element fixing member measuring 20.5×10.3 mm as viewed on a plane.

Figure 4:
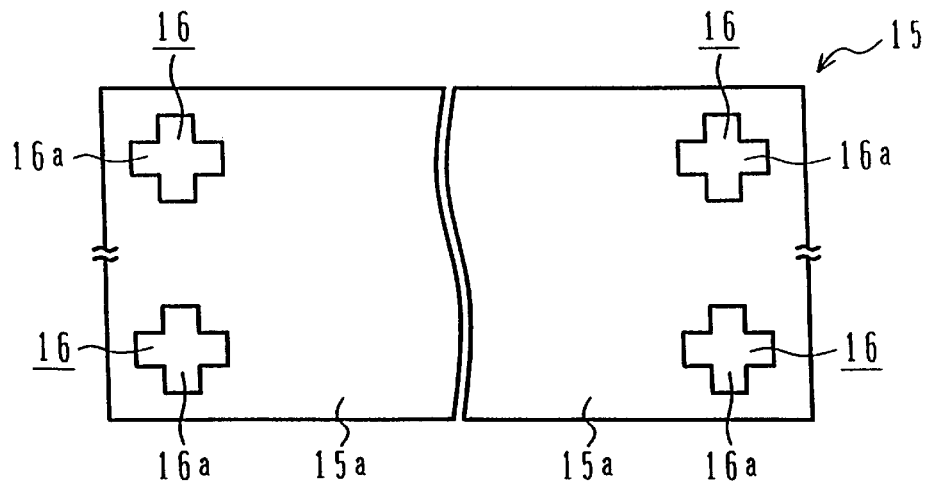
FIG. 4 is a plan view schematically illustrating an optical element fixing member produced in Example 4 as viewed from the side where the alignment marks are formed.

Referring to FIG. 4, alignment marks 16 are formed in a recessed manner having a crossed shape, as viewed on a plane, of 10 μm long, 10 μm wide and a depth of 0.03 μm with a line width of 3.0 μm at four corners on one surface of the optical element fixing member 15, the bottom surfaces 16a of the alignment marks 16 having a maximum surface roughness of 80 angstroms. The surface 15a of the optical element fixing member 15 of the side where the alignment marks 16 are formed (excluding the alignment marks 16) is substantially flat and has a maximum surface roughness of 800 angstroms.

The alignment marks 16 can be easily identified by eyes since the bottom surfaces 16a of the alignment marks 16 have the maximum surface roughness different from the maximum surface roughness on the periphery of the alignment marks 16.

The press-molding is effected in the same manner as described above with the exception of constituting a set of molds by using the first mold prepared in (1) above, second mold prepared in (2) above, and third mold prepared in (3) above, fixing the first mold onto the upper holder of the press molding machine in a manner that the transfer molding surface thereof becomes the lower surface, fixing the second mold onto the lower holder of the press molding machine in a manner that the transfer molding surface thereof becomes the upper surface, and using the third mold as a sleeve mold. There is obtained a optical element fixing member same as the optical element fixing member 15 shown in FIG. 4.

EXAMPLE 2

(1) Preparation of a First Mold by the Method aI.

First, a hard material containing WC is used as a mold material. The mold material has the shape of a flat plate measuring 30.0 mm long, 20.0 mm wide, 1.0 mm thick and having a maximum surface roughness of 100 angstroms. Next, resist patterns of a crossed shape measuring 10 μm long, 10 μm wide, 2.0 μm thick and having a line width of 3.0 μm as viewed on a plane are formed at four corners on one surface of the mold material quite in the same manner as in Example 1(1).

The resist patterns are post-baked at 120° C. for 60 minutes. Then, by using these resist patterns as masks, one surface of the mold material is dry-etched for 10 minute. The dry-etching is effected by using a reactive etching apparatus of the type of Inductively Coupled Plasma, and an Ar gas and a $CF_4$ gas are used as etching gases. The etching conditions consist of a coil bias of 600 W, a substrate bias of 600 W, an Ar gas flow rate of 20.0 sccm, a $CF_4$ gas flow rate of 10.0 sscm and a pressure of 5.0 mTorr.

Under the above-mentioned dry-etching conditions, the resist patterns are etched at a rate of 0.08 μm/min, and the thickness of thereof decreases down to 1.2 μm. Moreover, the surface of the mold material of the side on where the resist patterns are formed is etched at a rate of 0.03 μm/min except the portions that are protected by the resist patterns. As a result, there are formed shaping portions for forming the alignment mark transfer portions of the same shape as those formed in Example 1(1) at four corners on one surface of the mold material (hereinafter referred to as "base member") after dry-etching.

Then, the resist patterns are peeled off by using a predetermined peeling solution to obtain a base member for forming a first mold. The mold release film of the same composition and of the same thickness as the one formed in Example 1(1) is formed on the whole outer surface of the base member of the side where the shaping portions are formed for forming the alignment mark transfer portions according to the same method as that employed in Example 1(1).

Through the steps up to forming the mold release film, a desired first mold is obtained. This mold is one of the molds A of the present invention.

The first mold comprises the base member and the mold release film, and in which the surface of the mold release film serves as the transfer molding surface. On the transfer molding surface are formed four alignment mark transfer portions constituted by the shaping portions for forming the alignment mark transfer portions and the portions of the mold release film covering the outer surfaces of the shaping portions.

The upper surfaces of the alignment mark transfer portions have a maximum surface roughness of 100 angstroms. On the transfer molding surface, the portion (peripheral portion) excluding the portions where the alignment mark transfer portions are formed, is substantially flat and has a maximum surface roughness of 300 angstroms.

(2) Preparation of a Second Mold.

A second mold which, when combined with the above-mentioned first mold, constitutes a set of molds of the side-free type, is obtained quite in the same manner as in Example 1(2) but using a base member of the shape of a flat plate of a hard material containing WC measuring 30 mm long, 20 mm wide, 1.0 mm thick and having a maximum surface roughness of 100 angstroms.

(3) Preparation of a Third Mold.

A third mold is obtained in the same manner as in Example 1(3) to constitute, when it is combined with the above-mentioned first mold and the second mold, a set of molds comprising three molds of an upper mold (the first mold or the second mold), a lower mold (the second mold or the first mold) and a sleeve mold (the third mold).

(4) Press-molding.

The press-molding is effected in quite the same manner as in Example 1(4) but using a set of molds constituted by using the first mold and the second mold, and using, as a shaping material, an alkali-free glass plate measuring 20.0× 10.0×3.0 mm, in order to obtain a optical element fixing member of a rectangular shape measuring 20.0×10.0 mm as viewed on a plane.

At four corners on one surface of the optical element fixing member, there are formed alignment marks in a recessed manner having a crossed shape measuring 10 μm long, 10 μm wide, 0.3 μm deep and having a line width of 3.0 μm as viewed on a plane. A maximum surface roughness is 80 angstroms on the bottom surfaces of the alignment marks. The surface (excluding alignment marks) of the optical element fixing member of the side where the alignment marks are formed, is substantially flat and has a maximum surface roughness of 800 angstroms.

The alignment marks can be easily identified by eyes since the maximum surface roughness on the bottom surfaces of the alignment marks is different from the maximum surface roughness on the periphery of the alignment marks.

The press-molding is effected in the same manner as described above with the exception of constituting a set of molds by using the first mold, second mold and third mold, using the first mold as the upper mold, the second mold as the lower mold and the third mold as the sleeve mold, thereby to obtain a optical element fixing member and having alignment marks similar to the one described above.

EXAMPLE 3

(1) Preparation of a First Mold by the Method aII.

First, amorphous carbon is used as the mold material. The mold material has the shape of a flat plate measuring 20.0 mm long, 10.0 mm wide, 3.0 mm thick and having a maximum surface roughness of 200 angstroms. Next, a negative-type electron beam resist (ZEP7000 produced by Nippon Zeon Co.) is applied by a spin-coating method onto one surface of the mold material to form a resin layer maintaining a thickness of 1.5 μm on one surface of the mold material.

Next, by using an electron beam (exposure of 55 μC/cm$^2$), equilateral triangles of a side of 50 μm long (each side having a line width of 5.0 $\mu$m) are drawn at four corners on the resin layer as viewed on a plane. The resin layer after drawn with the electron beam is developed by being immersed in a predetermined developing solution (ZEP500 produced by Nippon Zeon Co.) for 90 seconds.

The portion of the resin layer that is not drawn with the electron beam is dissolved and removed through the developing, and resist patterns of portions drawn with the electron beam are formed at four corners of the mold material. Each resist pattern has a shape of equilateral triangle having a side of 50 $\mu$m long and a line width of 5.0 $\mu$m as viewed on a plane, and having a thickness of 1.5 $\mu$m.

The resist patterns are post-baked at 200° C. for 30 minutes. By using these resist patterns as masks, one surface of the mold material is dry-etched for 10 minutes. The dry-etching is conducted by using a reactive etching apparatus of the type of Inductively Coupled Plasma, under the etching conditions same as those of Example 1(1) but using an Ar gas as the etching gas.

Under the above-mentioned dry-etching conditions, the resist patterns are etched at a rate of 0.11 $\mu$m/min, and the thickness thereof decreases down to 0.4 $\mu$m. Moreover, the surface of the mold material of the side on where the resist patterns are formed is etched at a rate of 0.09 $\mu$m/min, except the portions that are protected by the resist patterns. As a result, there are formed alignment mark transfer portions in a protruded manner of a height of 0.9 $\mu$m having an equilateral triangular frame shape of a side of 50 $\mu$m having a line width of 5.0 $\mu$m as viewed on a plane at four corners on one surface of the mold material after dry-etching.

Thereafter, the resin layer is peeled off by using a predetermined peeling solution to obtain a desired first mold. This mold is one of the molds A of the present invention.

The first mold is made of amorphous carbon of the shape of a rectangular flat plate measuring 20.0×10.0 mm as viewed on a plane, and the whole outer surface of the side where the alignment mark transfer portions are formed serves as a transfer molding surface.

A maximum surface roughness is 200 angstroms on the upper surfaces of the alignment mark transfer portions. On the transfer molding surface, the portion (peripheral portion) excluding the portions where the alignment mark transfer portions are formed is substantially flat and has a maximum surface roughness of 500 angstroms.

(2) Preparation of a Second Mold.

A second mold which, when combined with the above-mentioned first mold, constitutes a set of molds of the side-free type, is obtained by cutting and polishing a block of amorphous carbon into a flat plate measuring 20 mm long, 10 mm wide, 3.0 mm thick and having a surface roughness of 200 angstroms. In this second mold, one main surface serves as a transfer molding surface.

(3) Preparation of a Third Mold.

A block of amorphous carbon is cut and polished into a cylinder of a predetermined size to obtain a third mold which, when it is combined with the above-mentioned first mold and the second mold, constitutes a set of molds comprising three molds of an upper mold (the first mold or the second mold), a lower mold (the second mold or the first mold) and a sleeve mold (the third mold).

(4) Press-molding.

The press-molding is effected in quite the same manner as in Example 1(4) but using a set of molds constituted by the first mold and the second mold, and using, as a preform, a soda lime glass measuring 15.0×10.0×3.0 mm, in order to obtain a optical element fixing member of the shape of a rectangular plate measuring 15.0×10.0 mm as viewed on a plane.

At four corners on one surface of the optical element fixing member, there are formed alignment marks in a recessed manner 0.9 $\mu$m deep in an equilateral triangular frame shape having a side of 50 $\mu$m and a line width of 5.0 $\mu$m as viewed on a plane. A maximum surface roughness is 180 angstroms on the bottom surfaces of the alignment marks. The surface (excluding alignment marks) of the optical element fixing member of the side where the alignment marks are formed, is substantially flat and has a maximum surface roughness of 450 angstroms.

The alignment marks can be easily identified by eyes since the maximum surface roughness on the bottom surfaces of the alignment marks is different from the maximum surface roughness on the periphery of the alignment marks.

The press-molding is effected in the same manner as described above with the exception of constituting a set of molds by using the first mold, second mold and third mold, using the first mold as the upper mold, the second mold as the lower mold and the third mold as the sleeve mold, thereby to obtain a optical element fixing member and having alignment marks similar to the one described above.

EXAMPLE 4

(1) Preparation of a First Mold by the Method aI.

First, a hard material of the same composition as the hard material used in Example 1 is used as the mold material. The mold material has the shape of a flat plate measuring 20.0 mm long, 10.0 mm wide and 2.0 mm thick. One edge in the direction of length on one surface of the mold material is cut and removed into a predetermined width and a thickness to form a flat surface (hereinafter, the flat surface that is polished as described later is referred to as "flat surface for forming a first transfer portion"). Furthermore, both edges (excluding the flat surface for forming the first transfer portion) in the direction of width on the surface of the mold material are cut and removed over a predetermined width and thickness to form flat surfaces (a total of two flat surfaces; hereinafter these flat surfaces after polished are generally referred to as "flat surfaces for forming second transfer portions"), and these flat surfaces are polished together with the flat surface obtained above by grinding, so that a maximum surface roughness becomes 100 angstroms. The flat surface for forming the first transfer portion and the flat surfaces for forming the second transfer portions, are located substantially on a plane.

Next, the shaping portions for forming the alignment mark transfer portions are formed on the mold material by dry-etching the mold material (that has been subjected up to the step of forming the flat surfaces for forming the two kinds of transfer portions) quite in the same manner as in Example 1(1) with the exception of setting the number of the shaping portions for forming the alignment mark transfer portions to be two, and forming these shaping portions near the two corners on the flat surface for forming the first transfer portion (these corners are located at the end on one side of the mold material in the direction of length after it has been subjected up to the step of forming flat surfaces for forming the two kinds of transfer portions).

Then, a portion of the mold material (hereinafter this portion is referred to as "a region for forming protrusions for V-grooves") surrounded by the flat surface for forming the first transfer portion (the shaping portions have been formed thereon) and by the flat surfaces for forming the second transfer portions, is ground in order to form two protrusions in the region for forming protrusions for V-grooves, the protrusions having an isosceles triangular shape in vertical cross section in the direction of width.

The protrusions are so formed as to maintain a predetermined positional relationship relative to the shaping portions for forming the alignment mark transfer portions and so that the ends thereof on one side in the direction of length reaches the end of the mold material on one side thereof in the direction of length. These protrusions (hereinafter referred to as "protrusions for V-grooves") are so designed that there are formed two V-grooves (V-shaped grooves in vertical cross section in the direction of width, the same holds hereinafter) of a depth of 120 µm for fixing optical fibers onto the optical element fixing member to be obtained by using the desired first mold. The peripheries of the two protrusions for V-grooves are flat, and these flat surfaces are located substantially on a plane together with the flat surface for forming the first transfer portion and the flat surfaces for forming the second transfer portions.

The shaping portions for forming the alignment mark transfer portions and the protrusions for V-grooves are formed on the mold material thereby to obtain a base member for a desired first mold.

Thereafter, the mold release film of the same composition and the same thickness as the one formed in Example 1(1) is formed on the whole outer surface of the base member on the side where the shaping portions for forming the alignment mark transfer portions and the protrusions for V-grooves are formed, according to the same method as the one employed in Example 1(1) in order to obtain the desired first mold. This first mold is one of the molds A of the present invention.

The first mold comprises the base member and the mold release film. In this first mold, the surface of the mold release film serves as a transfer molding surface. In the transfer molding surface, there are formed (1) two alignment mark transfer portions constituted by the shaping portions for forming the alignment mark transfer portions and portions of the mold release film covering the outer surfaces of the shaping portions, and (2) two transfer portions for V-grooves constituted by the protrusions for V-grooves and portions of the mold release film covering the outer surface of the protrusions for V-grooves.

The maximum surface roughness is 100 angstroms on the upper surfaces of the alignment mark transfer portions. In the transfer molding surface, furthermore, the portions excluding the alignment mark transfer portions and the V-groove transfer portions, are substantially flat, and the transfer molding surface in the periphery of the alignment mark transfer portions has a maximum surface roughness of 1000 angstroms.

(2) Preparation of a Second Mold.

A second mold that constitutes a set of molds of the side-free type when it is combined with the above-mentioned first mold, is obtained quite in the same manner as in Example 1(2).

(3) Preparation of a Third Mold.

A third mold is obtained in the same manner as in Example 1(3) to constitute, when it is combined with the above-mentioned first mold and the second mold, a set of molds comprising three molds of an upper mold (the first mold or the second mold), a lower mold (the second mold or the first mold) and a sleeve mold (the third mold).

(4) Press-molding.

The optical element fixing member having a rectangular shape as viewed on a plane is obtained by conducting the press-molding quite in the same manner as in Example 1(4) with the exception of constituting a set of molds using the first mold and the second mold.

Figure 5:
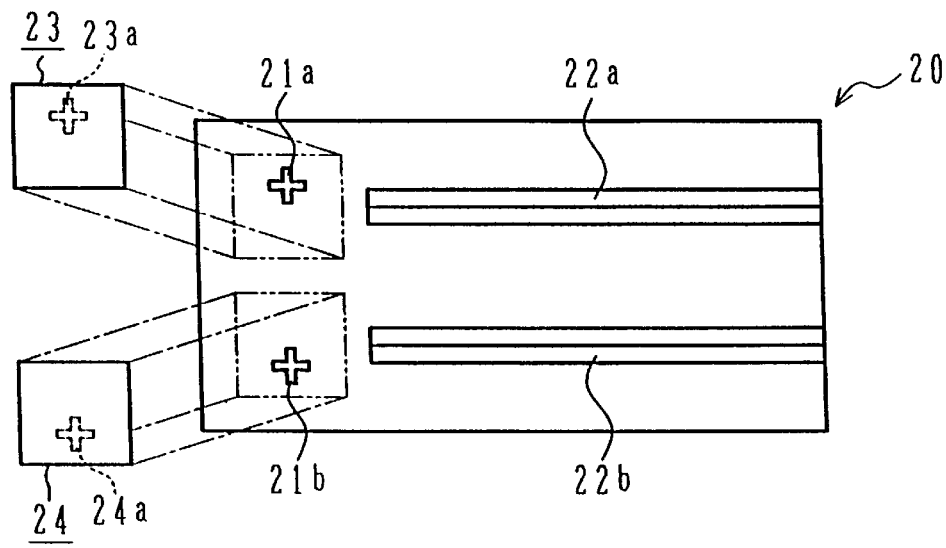
FIG. 5 is a plan view schematically illustrating the optical element fixing member produced in Example 4 as viewed from the side where the alignment marks are formed.

Referring to FIG. 5, in one surface of the optical element fixing member 20, there are formed alignment marks 21a, 21b near the two corners at an end on one side thereof in the direction of length, the alignment marks 21, 21b being formed in a recessed manner by the alignment mark transfer portions that are formed on the first mold. In the surface of the optical element fixing member 20, furthermore, there are formed two V-grooves 22a, 22b by the V-groove transfer portions that are formed on the first mold. The V-grooves 22a and 22b are for fixing optical fibers onto the optical element fixing member 20. The surface of the optical element fixing member 20 of the side where alignment marks 21a, 21b and V-grooves 22a, 22b are formed, is substantially flat except the portions where the alignment marks 21a, 21b and the V-grooves 22a, 22b are formed.

The alignment mark 21a and the V-groove 22a are so formed that a predetermined optical element 23 and an optical fiber are optically connected together when the optical element 23 (photo-diode, laser diode, etc., see FIG. 5) having an alignment mark 23a is fixed onto the optical element fixing member 20 by utilizing the alignment mark 23a formed on the optical element 23 and alignment mark 21a formed on the optical element fixing member 20 and when the optical fiber (not shown) is fixed to the V-groove 22a.

The alignment mark 21b and the V-groove 22b are so formed that a predetermined optical element 24 and an optical fiber are optically connected together when the optical element 24 (photo-diode, laser diode, etc., see FIG. 5) having an alignment mark 24a is fixed onto the optical element fixing member 20 by utilizing the alignment mark 24a formed on the optical element 24 and the alignment mark 21b formed on the optical element fixing member 20 and when the optical fiber (not shown) is secured to the V-groove 22b.

The above-mentioned alignment marks 21a and 21b can be easily identified by eyes since a maximum surface roughness is 80 angstroms on the bottom surfaces of the alignment marks 21a, 21b and a maximum surface roughness is 800 angstroms on the periphery of the alignment marks 21a, 21b.

A optical element fixing member having alignment marks similar to the one mentioned above is obtained by conducting the press-molding in the same manner as described above but by constituting a set of molds using the first mold, second mold and third mold, using the first mold as the upper mold, using the second mold as the lower mold and using the third mold as the sleeve mold.

EXAMPLE 5

(1) Preparation of a First Mold by the Method aI.

First, SiC is used as the mold material. The mold material has the shape of a disk 50.0 mm in diameter and 3.0 mm thick. Then, a region for forming protrusions for V-grooves is set onto a predetermined portion on one surface of the mold material, a portion other than the region for forming protrusions for V-grooves is cut and removed by a predetermined thickness to form a flat surface which is then polished so that a maximum surface roughness is 100 angstroms (hereinafter, the surface after polished is referred to as "flat surface for forming a transfer portion"). The region for forming protrusions for V-grooves has a size same as the size of the region for forming protrusions for V-grooves in Example 4(1).

Next, a negative-type electron beam resist (ZEP7000 produced by Nippon Zeon Co.) is applied by a spin-coating method onto the flat surface for forming a transfer portion in order to form a resin layer maintaining a thickness of 1.5 µm on one surface of the mold material. By using an electron beam (exposure of 55 µC/cm$^2$), crosses of a predetermined size are drawn at predetermined positions (a total of two places) on the resin layer. The resin layer after drawn with the electron beam is developed by being immersed in a predetermined developing solution (ZEP500 produced by Nippon Zeon Co.) for 90 seconds.

The portion of the resin layer that is not drawn with the electron beam is dissolved and removed through the developing, and resist patterns of portions drawn with the electron beam are formed at predetermined two places. Each resist pattern has the shape of a cross 10 $\mu$m long and 10 $\mu$m wide as viewed on a plane, and having a line width of 3.0 $\mu$m and a thickness of 1.5 $\mu$m.

The resist patterns are post-baked at 200° C. for 30 minutes. By using these resist patterns as masks, one surface of the mold material is dry-etched for 10 minutes. The dry-etching is conducted by using a reactive etching apparatus of the type of Inductively Coupled Plasma. A $CF_4$ gas is used as the etching gas. The etching conditions consist of a coil bias of 300 W. a substrate bias of 300 W, an etching gas ($CF_4$ gas) flow rate of 30.0 sscm, and a pressure of 10.0 mTorr.

Under the above-mentioned dry-etching conditions, the resist patterns are etched at a rate of 0.07 $\mu$m/min. Moreover, the surface of the mold material of the side on where the resist patterns are formed is etched at a rate of 0.07 $\mu$m/min except the portions that are protected by the resist patterns. As a result, there are formed the shaping portions for forming the alignment mark transfer portions in a protruded manner of a height of 0.7 $\mu$m having a crossed shape 10 $\mu$m long, 10 $\mu$m wide and having a line width of 3.0 $\mu$m as viewed on a plane at predetermined portions (a total of two places) on one surface of the mold material after dry-etching.

Thereafter, the region for forming protrusions for V-grooves is ground in the same manner as in Example 4(1) to form two protrusions for V-grooves to obtain a base member for a desired first mold. A mold release film having the same composition and the thickness as the one formed in Example 1(1) is formed on one surface of the base member (on the surface of the side where there are formed the shaping portions for forming the alignment mark transfer portions and the protrusions for V-grooves) by the method same as the one employed in Example 1(1) to obtain the desired first mold. This first mold is one of the molds A of the present invention.

The first mold comprises the base member and the mold release film like the first mold obtained in Example 4(1). In the first mold, the surface of the mold release film serves as a transfer molding surface. On the transfer molding surface are formed two alignment mark transfer portions and two V-groove transfer portions like that of the first mold produced in Example 4(1).

The alignment mark transfer portions and the V-groove transfer portions are formed maintaining quite the same positional relationship as that of the first mold obtained in Example 4(1), and a maximum surface roughness is 100 angstroms on the upper surfaces of the alignment mark transfer portions. On the transfer molding surface, the portion excluding the portions where the alignment mark transfer portions and the V-groove transfer portions are formed, is substantially flat and has a maximum surface roughness of 1000 angstroms.

(2) Preparation of a Second Mold.

A second mold which, when combined with the above-mentioned first mold, constitutes a set of molds of the side-free type, is obtained in quite the same manner as in Example 4(2) with the exception of using, as a base member, a disk made of SiC having a diameter of 50.0 mm, a thickness of 3.0 mm and a maximum surface roughness of 100 angstroms.

(3) Preparation of a Third Mold.

A third mold is obtained in the same manner as in Example 1(3) but using a block of SiC to constitute, when it is combined with the above-mentioned first mold and the second mold, a set of molds comprising three molds of an upper mold (the first mold or the second mold), a lower mold (the second mold or the first mold) and a sleeve mold (the third mold).

(4) Press-molding.

A optical element fixing member having the same shape and the size as the optical element fixing member obtained in Example 4(4), is obtained by conducting the press-molding in quite the same manner as in Example 4(4) with the exception of constituting a set of molds using the first mold and the second mold. In conducting the press-forming, the preform is so disposed that there is obtained the optical element fixing member having a desired shape.

In the thus obtained optical element fixing member, the alignment marks are easily identified by eyes since a maximum surface roughness is 80 angstroms on the bottom surfaces of the alignment marks and a maximum surface roughness is 800 angstroms on the periphery of the alignment marks.

A optical element fixing member having alignment marks similar to the one mentioned above is obtained by conducting the press-molding in the same manner as described above but by constituting a set of molds using the first mold, second mold and third mold, using the first mold as the upper mold, using the second mold as the lower mold and using the third mold as the sleeve mold.

EXAMPLE 6

(1) Preparation of a First Mold by the Method aI.

A mold is obtained in quite the same manner as in Example 2(1) but changing the shape and the positions of the alignment mark transfer portions as viewed on a plane. This mold has a total of eight alignment mark transfer portions of an L-shape 10 $\mu$m long, 10 $\mu$m wide and having a line width of 3.0 $\mu$m as viewed on a plane. Among the eight alignment mark transfer portions, four are so formed as will be overlapped on any of the four corners of a first rectangle having a predetermined size thereby to constitute a first group of alignment mark transfer portions. The remaining four alignment mark transfer portions are so formed as will be overlapped on any of the four corners of a second rectangle having the same size as the first rectangle and are arranged in the direction of width of the first mold maintaining a predetermined distance from the first rectangle. The remaining four alignment mark transfer portions form a second group of alignment mark transfer portions.

A maximum surface roughness is 100 angstroms on the upper surfaces of the alignment mark transfer portions that constitute the first group of alignment mark transfer portions and the second group of alignment mark transfer portions. On the transfer molding surface of the mold, the portion (peripheral portion) excluding the portions where the alignment mark transfer portions are formed, is substantially flat and has a maximum surface roughness of 1000 angstroms. This mold forms a first mold being combined with a mold that will be described next, and is hereinafter referred to as "mold 1a".

Separately from the above-mentioned mold 1a, a mold 1b is prepared in a manner as described below.

As a mold material, first, there is used a flat plate of a rectangular shape as viewed on a plane of a hard material having the same composition as that of the above-mentioned mold 1a. Edges on both sides on one surface of the mold material in the direction of width are cut and removed over a predetermined width and a thickness to form flat surfaces (a total of two surfaces). These flat surfaces are polished such that their maximum surface roughness is 100 angstroms (hereinafter, these surfaces are referred to as "flat surfaces for forming transfer portions").

Then, the shaping portions for forming the alignment mark transfer portions are formed on the mold material by dry-etching the mold material (on which have been formed flat surfaces for forming the transfer portions) in quite the same manner as in Example 1(1) with the exception of setting the number of the shaping portions for forming the alignment mark transfer portions to be two and forming the shaping portions at predetermined portions on the flat surfaces for forming the transfer portions.

Next, a portion of the mold material sandwiched by the two flat surfaces for forming the transfer portions as viewed on a plane, is ground in the same manner as in Example 4(1) to form two protrusions for V-grooves, thereby to obtain a base member for a desired mold (mold 1b). The protrusions for V-grooves are so formed as to maintain a predetermined positional relationship relative to the shaping portions for forming the alignment mark transfer portions on the base member, and as to reach the end of the other side of the base member from the end of the one side thereof in the direction of length. Moreover, the protrusions for V-grooves are so designed as to form two V-grooves of a depth of 120 μm for fixing optical fibers onto the optical element fixing member when the optical element fixing member is obtained by utilizing the first mold that is finally obtained.

Next, a mold release film comprising Au, Pt, Pd and Rh maintaining a thickness of 1500 angstroms is formed on the whole outer surface of the base member on the side where there are formed the shaping portions for forming the alignment mark transfer portions and the protrusions for V-grooves in quite the same manner as in Example 1(1) in order to obtain a desired mold 1b.

In the transfer molding surface of the mold 1b are formed the alignment mark transfer portions and the V-groove transfer portions, and a maximum surface roughness is 100 angstroms on the upper surfaces of the alignment mark transfer portions. On the transfer molding surface of the mold 1b, furthermore, the portion excluding the portions where the alignment mark transfer portions and the V-groove transfer portions are formed, is substantially flat and has a maximum surface roughness of 1000 angstroms.

Thereafter, the above-mentioned mold 1a and the mold 1b are combined together using a fixing frame so that the transfer molding surfaces formed in these molds face the same direction, thereby to obtain a desired first mold.

In the thus obtained first mold, the transfer molding surface (excluding the alignment mark transfer portions) of the mold 1a is more protruded than the transfer molding surface (excluding the alignment mark transfer portions and the V-groove transfer portions) of the mold 1b, and the alignment mark transfer portions formed on the mold 1b are located on the side of one end of the first mold in the direction of length. The first mold has a rectangular shape as viewed on a plane.

(2) Preparation of a Second Mold.

A second mold which, when combined with the above-mentioned first mold, constitutes a set of molds of the side-free type, is obtained in quite the same manner as in Example 1(2).

(3) Preparation of a Third Mold.

A third mold is obtained in the same manner as in Example 1(3) to constitute, when it is combined with the above-mentioned first mold and the second mold, a set of molds comprising three molds of an upper mold (the first mold or the second mold), a lower mold (the second mold or the first mold) and a sleeve mold (the third mold).

(4) Press-molding.

A optical element fixing member having a rectangular shape on a plane is obtained by conducting the press-molding in quite the same manner as in Example 1(4) with the exception of constituting a set of molds using the first mold and the second mold, and using, as a preform, an alkali-free glass plate of a rectangular shape having a predetermined size as viewed on a plane.

Figure 6:
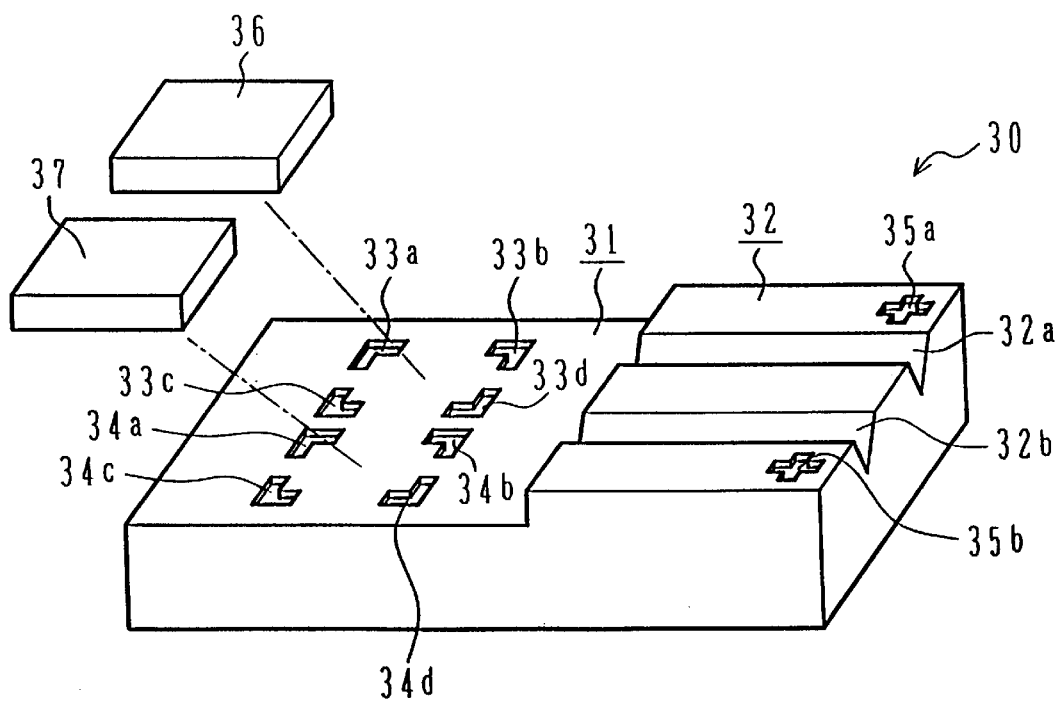
FIG. 6 is a perspective view schematically illustrating the optical element fixing members produced in Example 6.

As shown in FIG. 6, the optical element fixing member 30 have a pedestal 31 formed by the mold 1a and an optical fiber-engaging portion 32 formed by the mold 1b. The pedestal 31 is lower by a step than the optical fiber engaging portion. At nearly the center in the upper surface of the pedestal 31 as viewed on a plane, there are formed, in a recessed manner, four alignment marks 33a, 33b, 33c and 33d relying upon the first group of alignment mark transfer portions formed on the mold 1a, and four alignment marks 34a, 34b, 34c and 34d relying upon the second group of alignment mark transfer portions formed on the mold 1a. The peripheries of these alignment marks are substantially flat.

In the optical fiber-engaging portion 32, on the other hand, there are formed two V-grooves 32a, 32b relying upon the V-groove transfer portions formed on the mold 1b, and two alignment marks 35a, 35b in a recessed manner relying upon the alignment mark transfer portions formed on the mold 1b. The V-grooves 32a and 32b are to fix the optical fibers, and has a depth of 120 μm. The alignment marks 35a and 35b are formed at the end on one side of the optical element fixing member 30 in the direction of length. The surface of the optical fiber-engaging portion 32 on which the V-grooves 32a, 32b and alignment marks 35a, 35b are formed, is substantially flat but excluding the V-grooves 32a, 32b and the alignment marks 35a, 35b.

The alignment marks 33a, 33b, 33c, 33d (hereinafter often referred to as "a first group of alignment marks") and the V-groove 32a are so formed that an optical element 36 (photodiode or laser diode, see FIG. 6) and an optical fiber are optically connected together when the optical element 36 of a rectangular shape having a predetermined size as viewed on a plane is positioned by utilizing the first group of alignment marks and is fixed to the optical element fixing member 30 and when the optical fiber is fixed to the V-groove 32a.

Furthermore, the alignment marks 34a, 34b, 34c, 34d (hereinafter often referred to as "a second group of alignment marks") and the V-groove 32b are so formed that an optical element 37 (photodiode or laser diode, see FIG. 6) and an optical fiber are optically connected together when the optical element 37 of a rectangular shape having a predetermined size as viewed on a plane is positioned by utilizing the second group of alignment marks and is fixed to the optical element fixing member 30 and when the optical fiber is fixed to the V-groove 32b.

The alignment marks 33a, 33b, 33c, 33d, 34a, 34b, 34c and 34d are easily identified by eyes since a maximum surface roughness is 80 angstroms on the bottom surfaces of the alignment marks 33a, 33b, 33c and 33d that constitute the first group of alignment marks, a maximum surface roughness is 80 angstroms on the bottom surfaces of the alignment marks 34a, 34b, 34c and 34d that constitute the second group of alignment marks, and a maximum surface roughness is 800 angstroms on the periphery of the alignment marks (on the surface of the pedestal 31). Similarly, the alignment marks 35a and 35b are easily identified by eyes since a maximum surface roughness is 80 angstroms on the bottom surfaces of the alignment marks 35a and 35b and a maximum surface roughness is 800 angstroms on the periphery of the alignment marks (on the surface of the optical fiber-engaging portion 32).

A optical element fixing member and having alignment marks similar to the one mentioned above is obtained by conducting the press-molding in the same manner as described above but by constituting a set of molds using the first mold, second mold and third mold, using the first mold as the upper mold, using the second mold as the lower mold and using the third mold as the sleeve mold.

EXAMPLE 7

(1) Preparation of a First Mold by the Method aII.

First, a flat plate of amorphous carbon measuring 20.0 mm long, 10.0 mm wide, 3.0 mm thick and having a maximum surface roughness of 200 angstroms is used as a mold material, and a flat surface for forming a first transfer portion and a flat surface for forming a second transfer portion are formed on one surface of the mold material in quite the same manner as in Example 4(1).

Next, alignment mark transfer portions are formed on the mold material by dry-etching the mold material (on which has been formed the two kinds of flat surfaces for forming the transfer portions) in quite the same manner as in Example 3(1) with the exception of setting the number of the alignment mark transfer portions to be two, forming the alignment mark transfer portions in a crossed shape as viewed on a plane, and forming the alignment mark transfer portions at positions near the two corners on the flat surface for forming the first transfer portion (the corners are located at an end on one side in the lengthwise direction of the mold material on which have been formed two kinds of flat surfaces for forming transfer shaping portions).

The flat surface for forming the second transfer portions is ground in the same manner as in Example 4(1) to form two V-groove transfer portions comprising protrusions of an isosceles triangular shape in vertical cross section in the direction of width.

Upon forming the alignment mark transfer portions and the V-groove transfer portions, there is obtained a desired first mold. This first mold is one of the molds A of the present invention.

The above-mentioned first mold comprises amorphous carbon of the shape of a rectangular flat plate measuring 20.0×10.0 mm as viewed on a plane, and the whole outer surface of the side where the alignment mark transfer portions and the V-groove transfer portions are formed, serves as the transfer molding surface. The V-groove transfer portions are so formed as to maintain a predetermined positional relationship relative to the alignment mark transfer portions, and the end on one side thereof in the lengthwise direction reaches the end on one side in the lengthwise direction of the first mold. The V-groove transfer portions are so designed as to form two V-grooves of a depth of 120 $\mu$m for fixing the optical fibers to the optical element fixing member when the optical element fixing member is obtained by using the mold.

A maximum surface roughness is 100 angstroms on the upper surfaces of the alignment mark transfer portions. On the transfer molding surface, the portions excluding the portions where the alignment mark transfer portions and the V-groove transfer portions are formed, are substantially flat. The transfer molding surface in the periphery of the alignment mark transfer portions has a maximum surface roughness of 1000 angstroms.

(2) Preparation of a Second Mold.

A second mold which, when combined with the above-mentioned first mold, constitutes a set of molds of the side-free type, is obtained in quite the same manner as in Example 3(2).

(3) Preparation of a Third Mold.

A third mold is obtained in the same manner as in Example 3(3) to constitute, when it is combined with the above-mentioned first mold and the second mold, a set of molds comprising three molds of an upper mold (the first mold or the second mold), a lower mold (the second mold or the first mold) and a sleeve mold (the third mold).

(4) Press-molding.

A optical element fixing member having nearly the same shape as that of the optical element fixing member obtained in Example 4(4), is obtained by conducting the press-molding in the same manner as in Example 3(4) with the exception of constituting a set of molds using the first mold and the second mold.

In the thus obtained optical element fixing member, the alignment marks are easily identified by eyes since a maximum surface roughness is 80 angstroms on the bottom surfaces of the alignment marks and a maximum surface roughness is 800 angstroms on the periphery of the alignment marks.

A optical element fixing member having alignment marks similar to the one mentioned above is obtained by conducting the press-molding in the same manner as described above but by constituting a set of molds using the first mold, second mold and third mold, using the first mold as the upper mold, using the second mold as the lower mold and using the third mold as the sleeve mold.

EXAMPLE 8

(Preparation of a mold by the method bI.)

Use is made of a mold material having the same composition, shape and surface roughness as those of the mold material used in Example 1(1), a resist film having a thickness of 2.0 $\mu$m is formed on one surface of the mold material in the same manner as in Example 1(1), and the resist film is exposed and is developed in the same manners as in Example 1(1) to form resist patterns of a crossed shape at four corners on one surface of the mold material. The resist patterns have a crossed shape 10 $\mu$m long and 10 $\mu$m wide as viewed on a plane, and has a thickness of 2.0 $\mu$m.

The resist patterns are post-baked at 120° C. for 60 minutes. Then, by using these resist patterns as masks, one surface of the mold material is dry-etched for 10 minutes. The dry-etching is effected by using a reactive etching apparatus of the type of Inductively Coupled Plasma, and an Ar gas and a $CF_4$ gas are used as etching gases. The etching conditions are the same as the dry-etching conditions in Example 2(2).

Under the above-mentioned dry-etching conditions, the resist patterns are etched at a rate of 0.08 $\mu$m/min, and the thickness of thereof decreases down to 1.2 $\mu$m. Moreover, the surface of the mold material of the side on where the resist patterns are formed is etched at a rate of 0.03 $\mu$m/min except the portions that are protected by the resist patterns. As a result, there are formed protruded alignment marks of a crossed shape which are 10 $\mu$m long, 10 $\mu$m wide, and 0.3 $\mu$m high, having a line width of 3.0 $\mu$m as viewed on a plane, at four corners on one surface of the mold material after drying-etching.

The resist patterns are peeled off by using a predetermined peeling solution. Then, by using one of the alignment marks as references, a first groove and a second groove having a V-shape in vertical cross section in the direction of width are formed by using a grinding machine.

Referring to FIGS. 7(a) and 7(b), the first groove 41a and the second groove 41b are so formed as to maintain a predetermined distance between the center axes thereof in the lengthwise direction and the center of the alignment mark 42a as viewed on a plane, and so that they are located on the center side of the mold material inside of the alignment mark 42a when viewed in the lengthwise direction. The first groove 41a and the second groove 41b are so formed that when a molded article is press-molded by using a desired mold, the optical fiber can be engaged and positioned between the protrusion press-molded by the first groove 41a and the protrusion press-molded by the second groove 41b.

Furthermore, a third groove and a fourth groove having a V-shape in vertical cross section in the direction of width are formed by using the grinding machine with the alignment mark 42b (see FIG. 7) as a reference.

Referring to FIGS. 7(a) and 7(b), the third groove 43a and the fourth groove 43b are so formed as to maintain a predetermined distance between the center axes thereof in the lengthwise direction and the center of the alignment mark 42b as viewed on a plane, and so that they are located on the center side of the mold material inside of the alignment mark 42b when viewed in the lengthwise direction. The third groove 43a and the fourth groove 43b are so formed that when a molded article is press-molded by using a desired mold, the optical fiber can be engaged and positioned between the protrusion press-molded by the third groove 43a and the protrusion press-molded by the fourth groove 43b.

Upon forming the above-mentioned first groove 41a, second groove 41b, third groove 43a and fourth groove 43b, there is formed a transfer molding surface 44 constituted by a transfer pattern of the flat surface, a transfer pattern of the first groove 41a, a transfer pattern of the second groove 41b, a transfer pattern of the third groove 43a, a transfer pattern of the fourth groove 43b, and transfer patterns of alignment marks 42a, 42b, 42c and 42d, and, at the same time, there is obtained a desired mold 45 (see FIGS. 7(a) and 7(b)).

The mold 45 has a rectangular shape measuring 20.0×10.0 mm as viewed on a plane, and has the transfer molding surface 44 formed on one main surface thereof. A maximum surface roughness is 100 angstroms on the upper surfaces of the alignment marks 42a, 42b, 42c and 42d (on the upper surface in FIG. 7(b), the same holds in the following Examples 9 to 11), and a maximum surface roughness is 1000 angstroms on the periphery of the alignment marks 42a, 42b, 42c and 42d.

A glass molded article (optical element fixing member) is press-molded by using the above-mentioned mold 45, optical fibers are engaged between the protrusion formed on the molded article by the first groove 41a and the protrusion formed on the molded article by the second groove 41b, and between the protrusion formed on the molded article by the third groove 43a and the protrusion formed on the molded article by the fourth groove 43b, and these optical fibers are secured by using a holding member. By using the above-mentioned mold 45, another glass molded article (optical element fixing member) is prepared, and optical fibers (a total of two optical fibers) are engaged and secured onto the molded article in the same manner as described above. The optical fibers engaged and secured onto the one molded article and the optical fibers engaged and secured onto the other molded article, are optically connected together relying only upon the mechanical positioning between these molded articles (optical element fixing members). The optical fibers can be connected together with low loss.

EXAMPLE 9

(Preparation of the mold by the method bI)

First, amorphous carbon is used as the mold material. The mold material has the shape of a flat plate measuring 50.0 mm long, 50.0 mm wide, 3.0 mm thick and having a maximum surface roughness of 120 angstroms.

Next, a resin layer is formed on one surface of the mold material by applying a negative-type electron beam resist in the same manner as in Example 3(1). Then, in the same manner as in Example 3(1), the electron beam drawing is effected, the resin layer is developed, the resist pattern is formed, the resist pattern is post-baked, dry-etching is effected, and the resist pattern is peeled off, in order to form alignment marks in a protruded manner having the shape of an equilateral triangle frame of a side of 50 μm with a line width of 5.0 μm as viewed on a plane, and having a height of 0.9 μm, at four corners on one surface of the mold material.

Then, by using a grinder, a total of 16 grooves are formed having a V-shape in vertical cross section in the direction of width maintaining a pitch of 125 μm with the alignment marks as references. These grooves are so formed that, when an molded article is press-molded by using a desired mold, the optical fibers can be engaged and positioned among the protrusions (among the neighboring protrusions) formed on the molded article by the grooves.

Upon forming the above-mentioned grooves, there is formed a transfer molding surface constituted by a transfer pattern of the flat surface, transfer patterns of the total of 16 grooves and transfer patterns of the alignment marks, and, at the same time, there is obtained a desired mold.

The mold has a rectangular shape measuring 50.0×50.0 mm as viewed on a plane, and has the transfer molding surface formed on one main surface thereof. A maximum surface roughness is 120 angstroms on the upper surfaces of the alignment marks, and a maximum surface roughness is 1100 angstroms on the periphery of the alignment marks.

Two glass molded articles (optical element fixing member) are prepared by using the above-mentioned mold, and the optical fibers are optically connected together by using these optical element fixing member in the same manner as in Example 8. The same results as those of Example 8 are obtained.

EXAMPLE 10

(Preparation of the mold by the method bI)

First, a cermet comprising chiefly $Al_2O_3$ is used as the mold material. The mold material has the shape of a flat plate measuring 40.0 mm long, 40.0 mm wide, 2.0 mm thick and having a maximum surface roughness of 110 angstroms. Next, resist patterns of a crossed shape 10 μm long, 10 μm wide and having a line width of 5.0 μm as viewed on a plane and a thickness of 2.0 μm are formed at four corners on one surface of the mold material in the same manner as in Example 9.

The resist patterns are post-baked at 200° C. for 30 minutes. By using the resist patterns as masks, one surface of the mold material is dry-etched for 5 minutes. The dry-etching is effected by using a reactive etching apparatus of the type of Inductively Coupled Plasma, and an Ar gas is used as the etching gas. The etching conditions consist of a coil bias of 600 W, a substrate bias of 600 W, an etching gas (Ar gas) flow rate of 30.0 sscm, and a pressure of 5.0 mTorr.

Through the dry-etching under the above-mentioned conditions, the resist patterns are etched at a rate of 0.13 μm/min. The surface of the mold material of the side where the resist patterns are provided is etched at a rate of 0.11 μ/min except the portions protected by the resist patterns. As a result, alignment marks are formed in a protruded manner having a crossed shape as viewed on a plane and having a height of 0.5 µm at four corners on one surface of the mold material after dry-etching, and a flat surface is formed in the periphery thereof.

The resist patterns are peeled off by using a predetermined peeling solution, and a total of four grooves having a V-shape in vertical cross section in the direction of width are formed by using a grinder in quite the same manner as in Example 8. Upon forming these grooves, there is formed a transfer molding surface constituted by a transfer pattern of the flat surface, transfer patterns of the total of four grooves and transfer patterns of the alignment marks, and, at the same time, there is obtained a desired mold.

The mold has a rectangular shape measuring 40.0×40.0 mm as viewed on a plane, and has the transfer molding surface formed on one main surface thereof. A maximum surface roughness is 110 angstroms on the upper surfaces of the alignment marks, and a maximum surface roughness is 1100 angstroms on the periphery of the alignment marks.

Two glass molded articles (optical element fixing member) are press-molded by using the above-mentioned mold, and the optical fibers are optically connected together by using these optical element fixing members in the same manner as in Example 8. There are obtained the same results as those of Example 8.

EXAMPLE 11
(Preparation of a mold by the method bII)

Use is made of a mold material having the same composition, shape and maximum surface roughness as those of the mold material used in Example 8, and resist patterns having a crossed shape as viewed on a plane and having a line width of 10.0 µm and a thickness of 4.0 µm are formed at four corners on one surface of the mold material in the same manner as in Example 8.

The resist patterns are post-baked at 120° C. for 60 minutes. By using these resist patterns as masks, one surface of the mold material is dry-etched for one minute. The dry etching is effected by using a reactive etching apparatus of the type of Inductively Coupled Plasma, and a $Cl_2$ gas is used as the etching gas. The etching conditions consist of a coil bias of 600 W, a substrate bias of 600 W, an etching gas ($Cl_2$ gas) flow rate of 20.0 sscm, and a pressure of 5.0 mTorr.

Through the dry-etching under the above-mentioned conditions, the resist patterns are etched at a rate of 0.28 µm/min and the thickness decreases down to 3.72 µm. The surface of the mold material of the side where the resist patterns are provided is etched at a rate of 0.05 µ/min except the portions protected by the resist patterns. As a result, alignment marks are formed in a protruded manner having a crossed shape as viewed on a plane and having a height of 0.05 µm at four corners on one surface of the mold material after dry-etching, and a flat surface is formed in the periphery thereof.

The resist patterns are peeled off by using a redetermined peeling solution, and a total of 16 grooves having a U-shape in vertical cross section in the direction of width are formed by using a grinder using one of the alignment mark as references. The grooves are so formed that the optical fibers can be engaged and positioned among the protrusions (among the neighboring protrusions) formed on the molded article by the grooves when the article is press-molded by using a desired mold.

Upon forming these grooves, there is formed a transfer molding bare surface constituted by a bare transfer pattern of the flat surface, bare transfer patterns of the total of 16 grooves and bare transfer patterns of the alignment marks.

Next, by using an RF magnetron sputtering apparatus, a mold release film comprising Au, Pt, Pd and Rh and having a thickness of 1500 angstroms is formed so as to cover the transfer molding bare surface. The sputtering is effected while setting the atmosphere gas (Ar gas) flow rate to be 20.0 sscm, setting the pressure of atmosphere to be 1.0 Pa, and the RF bias to be 300 W.

Upon forming the mold release film, there is obtained a desired mold. In this mold, the surface of the mold release film serves as the transfer molding surface. The transfer molding surface is constituted by recessed transfer patterns corresponding to the above-mentioned total of 16 grooves, protruded transfer patterns corresponding to the alignment marks, and flat surfaces formed in the peripheries thereof.

Two glass molded articles (optical element fixing member) are press-molded by using the above-mentioned mold, and the optical fibers are optically connected together by using these optical element fixing members in the same manner as in Example 8. There are obtained the same results as those of Example 8.

EXAMPLE 12
(1) Preparation of a First Mold by the Method cI.

First, a hard material containing WC is used as a mold material. The mold material has the shape of a disk having a diameter of 76.3 mm, a thickness of 2.0 mm and a maximum surface roughness of 100 angstroms. Next, a positive-type photo-resist (AZ1350 produced by Hoechst Co.) is applied by a spin-coating method onto one surface of the mold material to form a resist film 52 having a thickness of 4.0 µm on one surface of the mold material 51 as shown in FIG. 8(*a*).

Next, a photomask of a predetermined shape is intimately adhered onto the resist film 52, i.e., a photomask having light-shielding portions, each light-shielding portions has a line width of 12.5 µm, of a predetermined pattern are intimately adhered thereon so that the light-shielding portions are positioned on the side of the resist film 52. Then, the resist film 52 is exposed to ultraviolet ray (exposure of 25 mW/cm$^2$) from the side of the photomask, and is developed by being immersed in a predetermined developing solution (AZ developer solution produced by Hoechst Co.) for 90 seconds.

Figure 8:
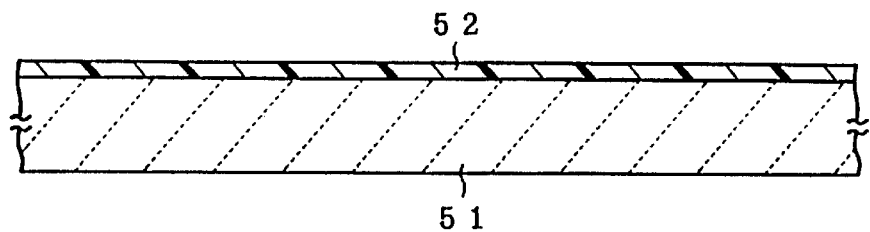
Figure 8:
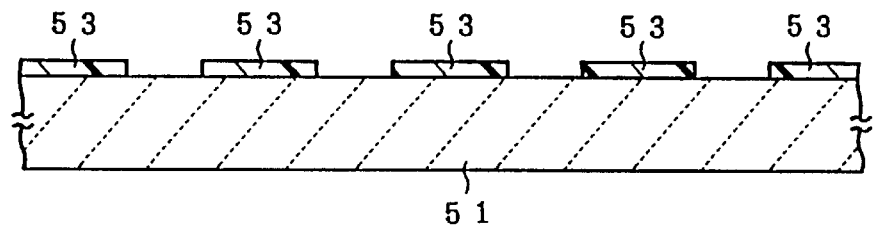
Figure 8:
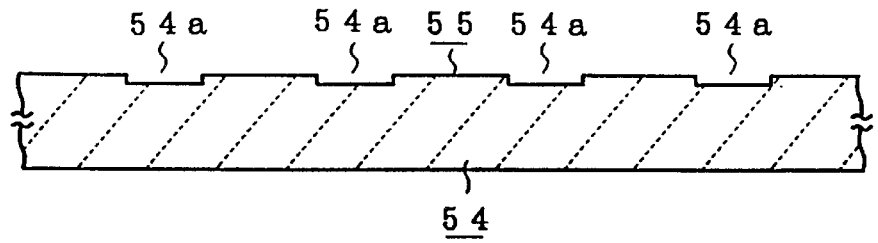
Figure 8:
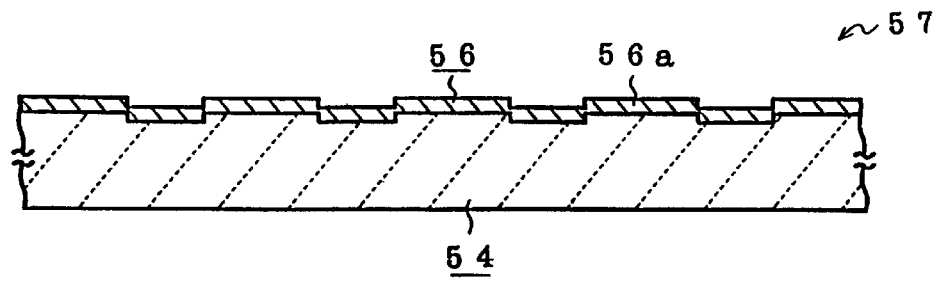

Through the developing, the exposed portions of the resist film 52 are dissolved and removed, and resist patterns 53 of a predetermined shape constituted by the portions that are not exposed (portions that are not exposed to ultraviolet ray being interrupted by the light-shielding portions formed on the photomask) are formed in a predetermined number as shown in FIG. 8(*b*).

The resist patterns 53 are post-baked at 120° C. for 60 minutes. Then, by using these resist patterns 53 as masks, one surface of the mold material 51 is dry-etched for 10 minutes. The dry-etching is effected by using a reactive etching apparatus of the type of Inductively Coupled Plasma, and an Ar gas and a $CF_4$ gas are used as etching gases. The etching conditions are the same as the dry-etching conditions in Example 2(1).

Under the above-mentioned dry-etching conditions, the resist patterns 53 are etched at a rate of 0.08 µm/min, and the surface of the mold material 51 of the side on where the resist patterns 53 are formed is etched at a rate of 0.03 µm/min except the portions that are protected by the resist patterns 53.

Then, the resist patterns are peeled off by using a predetermined peeling solution to obtain a base member for a desired first mold. Referring to FIG. 8(*c*), a predetermined number of grooves 54*a* having a width of 12.5 µm and a depth of 0.3 µm are formed in a predetermined pattern in one surface of the base member 54. In the base member 54, the surface of the side where the grooves 54a are formed is serving as the transfer molding bare surface 55.

Next, by using an RF sputtering apparatus, a mold release film comprising Au, Pt and Ir is formed maintaining a thickness of 0.1 µon the transfer molding bare surface 55 of the base member 54. The sputtering is effected by setting the atmosphere gas (Ar gas) flow rate to be 20.0 sscm, the atmosphere pressure to be 1.0 Pa, and the RF bias to be 300 W.

Upon forming the mold release film, there is obtained a first mold which is one of the molds CI of the present invention. Referring to FIG. 8(d), the first mold 57 comprises the base member 54 and the mold release film 56 formed on the transfer molding bare surface 55 of the base member 54, and the transfer patterns are constituted by the transfer molding bare surface 55 and the mold release film 56. The shape of the transfer molding bare surface 55 is reflected on the mold release film 56, and the surface 56a of the mold release film 56 serves as the transfer molding surface of the first mold 57.

(2) Preparation of a Second Mold.

A disk of a hard material containing WC having a diameter of 76.3 mm, a thickness of 2.0 mm and a maximum surface roughness of 100 angstroms is used as a base member for a second mold. A mold release film having the same composition and the thickness as the one formed at the time of preparing the first mold, is formed by sputtering on one surface of the base member. Upon forming the mold release film, there is obtained the second mold which, when combined with the above-mentioned first mold, constitutes a set of molds of the side-free type.

(3) Preparation of a Third Mold.

A block of a hard material containing WC is cut and polished into a cylinder of a predetermined size to obtain a base member. A mold release film having the same composition and the thickness as those of the mold release film formed at the time of preparing the first mold, is formed on the inner surface of the base member to obtain a third mold which, when it is combined with the above-mentioned first mold and the second mold, constitutes a set of molds comprising three molds of an upper mold (the first mold or the second mold), a lower mold-(the second mold or the first mold) and a sleeve mold (the third mold).

(4) Press-molding.

First, a set of molds is constituted by using the first mold prepared in (1) above and the second mold prepared in (2) above, and the first mold is secured to an upper holder of a press molding machine in a manner that the transfer molding surface thereof becomes the lower surface, and the second mold is secured to a lower holder of the press molding machine in a manner that the transfer molding surface thereof becomes the upper surface. A mold material of a soda lime glass (preform) of the shape of a disk having a diameter of 60.0 mm and a thickness of 2.0 mm is placed on the lower mold (the second mold), and the press-molding is effected in vacuum under the conditions of an upper mold (the first mold) temperature of 660° C., a lower mold (the second mold) temperature of 630° C., a pressing force of 170 kg/cm$^2$, and a pressing time of 120 seconds, in order to obtain a diffraction grating of the shape of a circular plate having a diameter of 60.5 mm as viewed on a plane.

Figure 9:
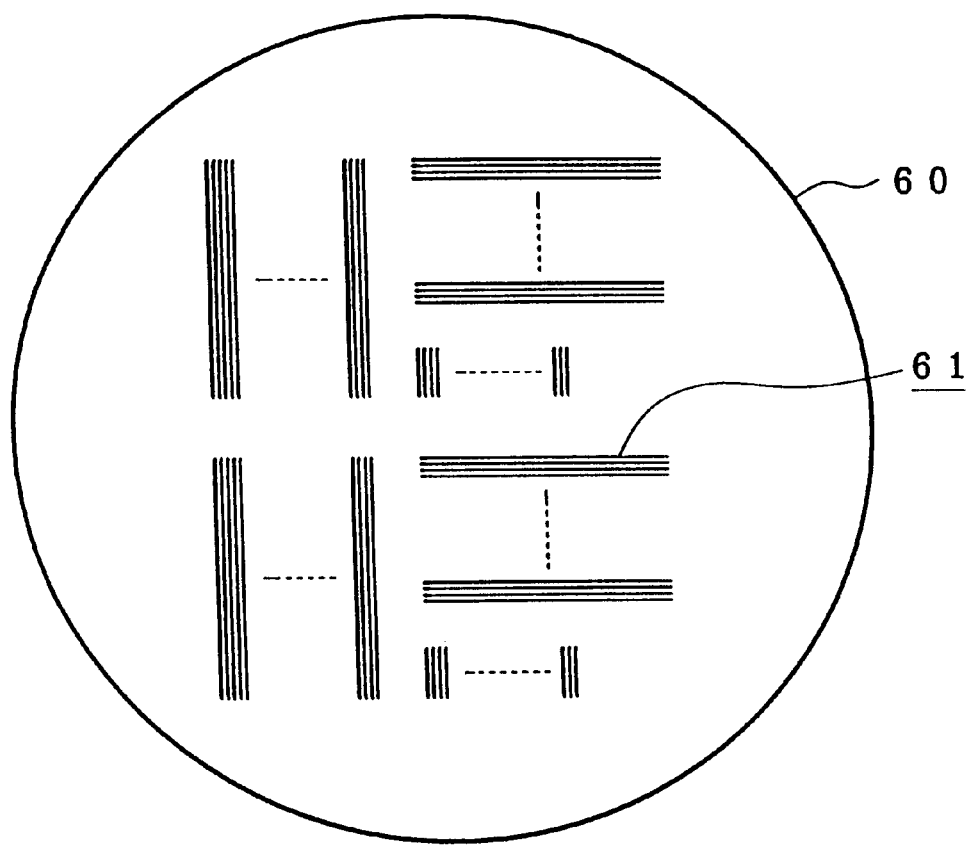
FIG. 9 is a plan view schematically illustrating a diffraction grating produced in Example 12.

As schematically shown in FIG. 9, a total of 100 sets of laminar grating portions 61 of a predetermined length including a predetermined number of grooves of a width of 12.5 µm and a depth of 0.3 µm maintaining a pitch of 25 µm are formed in one surface of the diffraction grating 60. The grooves constituting the laminar grating portions 61 are formed maintaining a accuracy of 12.5 µm±1% in width and 0.3 µm±3% in depth.

A diffraction grating same as the one mentioned above is obtained by conducting the press-molding in the same manner as described above with the exception of constituting a set of molds using the above-mentioned first mold, second mold and third mold, and using the first mold as the upper mold, using the second mold as the lower mold and using the third mold as the sleeve mold.

EXAMPLE 13

(1) Preparation of a First Mold by the Method cII.

First, a hard material comprising chiefly WC without containing binder component is used as the mold material. The mold material has the shape of a flat plate measuring 50.0 mm long, 50.0 mm wide, 3.0 mm thick and having a maximum surface roughness of 80 angstroms. Next, a negative-type electron beam resist (ZEP7000 produced by Nippon Zeon Co.) is applied by a spin-coating method onto one surface of the mold material to form a resin layer maintaining a thickness of 1.3 µm on one surface of the mold material.

Next, by using an electron beam (exposure of 55 µC/cm$^2$), a predetermined number of ring patterns are drawn on the resin layer. The resin layer after drawn with the electron beam is developed by being immersed in a predetermined developing solution (ZEP500 produced by Nippon Zeon Co.) for 90 seconds.

The portion of the resin layer that is not drawn with the electron beam is dissolved and removed through the developing, and the predetermined number of resist patterns comprising portions drawn with the electron beam are formed.

The resist patterns are post-baked at 200° C. for 30 minutes. By using these resist patterns as masks, one surface of the mold material is dry-etched for 10 minutes. The dry-etching is conducted by using a reactive etching apparatus of the type of Inductively Coupled Plasma, and an Ar gas and a Cl$_2$ gas are used as etching gases. The etching conditions consist of a coil bias of 600 W, a substrate bias of 300 W, an Ar gas flow rate of 30.0 sscm, a Cl$_2$ gas flow rate of 10.0 sscm and a pressure of 5.0 mTorr.

Under the above-mentioned dry-etching conditions, the resist patterns are etched at a rate of 0.06 µm/min, and the surface of the mold material of the side on where the resist patterns are formed is etched at a rate of 0.02 µm/min except the portions that are protected by the resist patterns.

Thereafter, the resin patterns after dry-etching are peeled off by using a predetermined peeling solution to obtain a base member for a desired first mold. In one surface of the base member are formed a predetermined number of annular grooves having a width of 2.5 µm and a depth of 0.2 µm in a predetermined pattern. In this base member, the surface of the side where the grooves are formed serves as a transfer molding bare surface.

Next, by using an RF sputtering apparatus, a mold release film comprising Au, Pt, Pd and Rh is formed maintaining a thickness of 0.1 µm on the transfer molding bare surface of the base member. The sputtering is effected by setting the atmosphere gas (Ar gas) flow rate to be 20.0 sscm, the atmosphere pressure to be 1.0 Pa, and the RF bias to be 300 W.

Upon forming the mold release film, there is obtained a first mold which is one of the molds CI of the present invention. The first mold comprises the base member and the mold release film, and the transfer patterns are constituted by the transfer molding bare surface and the mold release film. The shape of the transfer molding bare surface is reflected on the mold release film, and the surface of the mold release film serves as the transfer molding surface of the first mold.

(2) Preparation of a Second Mold.

A flat plate of the same hard material as the one used as the mold material in (1) above and measuring 50.0 mm long, 50.0 mm wide, 3.0 mm thick and having a maximum surface roughness of 80 angstroms, is used as a base member for a second mold. A mold release film having the same composition and the thickness as the one formed at the time of preparing the first mold, is formed on one surface of the base member by sputtering. Upon forming the mold release film, there is obtained the second mold which, when combined with the above-mentioned first mold, constitutes a set of molds of the side-free type.

(3) Preparation of a Third Mold.

A block of the same hard material as the one used as the mold material in (1) above is cut and polished into a cylinder of a predetermined size to obtain a base member. A mold release film having the same composition and the thickness as those of the mold release film formed at the time of preparing the first mold, is formed by sputtering on the inner surface of the base member to obtain a third mold which, when it is combined with the above-mentioned first mold and the second mold, constitutes a set of molds comprising three molds of an upper mold (the first mold or the second mold), a lower mold (the second mold or the first mold) and a sleeve mold (the third mold).

(4) Press-molding.

A zone plate of the shape of a rectangular flat plate measuring 50.2×50.2 mm as viewed on a plane and having a thickness of 1.9 mm is obtained by conducting the press-molding in quite the same manner as in Example 12(4) with the exception of constituting a set of molds using the first mold and the second mold, using a preform of N5 (glass material produced by HOYA Co.) measuring 50.0×50.0×2.0 mm and setting the pressing force to be 160 kg/cm$^2$.

Figure 10:
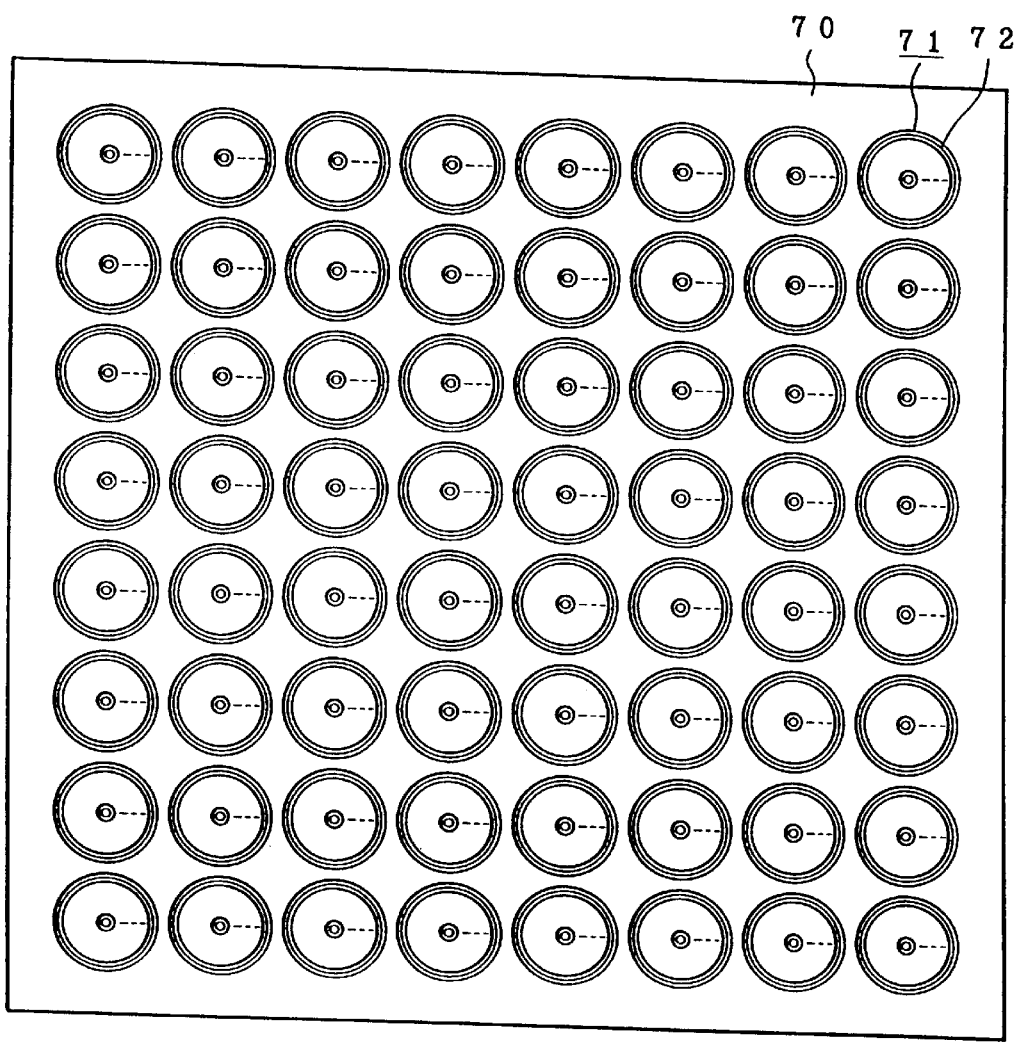
FIG. 10 is a plan view schematically illustrating a zone plate produced in Example 13.

As schematically shown in FIG. 10, a total of 64 ring patterns 71 are formed like a matrix on one surface of the zone plate 70. The ring patterns 71 are formed by a total of 100 annular grooves 72 that are concentrically formed maintaining a predetermined pitch, each annular groove 72 having a line width of 2.5 $\mu$m and a depth of 0.2 $\mu$m. The annular grooves 72 constituting the ring patterns 71 are formed maintaining a accuracy of 2.5 $\mu$m±4% in width and 0.2 $\mu$m±3% in depth.

A zone plate same as the one mentioned above is obtained by conducting the press-molding in the same manner as described above with the exception of constituting a set of molds using the first mold, second mold and third mold, and using the first mold as an upper mold, using the second mold as a lower mold and using the third mold as a sleeve mold.

EXAMPLE 14

(1) Preparation of a First Mold by the Method cII.

First, amorphous carbon is used as a mold material. The mold material has the shape of a disk having a diameter of 76.3 mm, a thickness of 2.0 mm and a maximum surface roughness of 120 angstroms. Next, a resist film is formed maintaining a thickness of 3.0 $\mu$m on one surface of the mold material in the same manner as in Example 12(1).

Next, a photomask of a predetermined shape is intimately adhered onto the resist film, i.e., a photomask having light-shielding portions, each light-shielding portions has a line width of 30 $\mu$m, of a predetermined pattern is intimately adhered onto the resist film so that the light-shielding portions are positioned on the side of the resist film. Then, the resist film is exposed and is developed in the same manner as in Example 12(1), and the predetermined number of resist patterns are formed.

The resist patterns are post-baked at 120° C. for 60 minutes. Then, by using these resist patterns as masks, one surface of the mold material is dry-etched for 5 minutes. The dry-etching is effected by using a reactive etching apparatus of the type of Inductively Coupled Plasma, and a CF$_4$ gas is used as the etching gas. The etching conditions consist of a coil bias of 600 W, a substrate bias of 300 W, a CF$_4$ gas flow rate of 20.0 sscm and a pressure of 5.0 mTorr.

Under the above-mentioned dry-etching conditions, the resist patterns are etched at a rate of 0.55 $\mu$m/min, and the surface of the mold material of the side on where the resist patterns are formed is etched at a rate of 0.08 $\mu$m/min except the portions that are protected by the resist patterns.

Then, the resist patterns after dry-etching are peeled off by using a predetermined peeling solution to obtain a first mold which is one of the molds CII of the present invention. A predetermined number of grooves having a width of 30 $\mu$m and a depth of 0.4 $\mu$m are formed in a predetermined pattern in one surface of the first mold. In this mold, the surface of the side where the grooves are formed is serving as the transfer molding surface.

(2) Preparation of a Second Mold.

A block of amorphous carbon is cut and polished into a disk having a diameter of 76.3 mm, a thickness of 2.0 mm and a maximum surface roughness of 120 angstroms to obtain a second mold which, when combined with the above-mentioned first mold, constitutes a set of molds of the side-free type.

(3) Preparation of a Third Mold.

A block of amorphous carbon is cut and polished into a cylinder of a predetermined size to obtain a third mold which, when it is combined with the above-mentioned first mold and the second mold, constitutes a set of molds comprising three molds of an upper mold (the first mold or the second mold), a lower mold (the second mold or the first mold) and a sleeve mold (the third mold).

(4) Press-molding.

A diffraction grating of the shape of a circular flat plate having a diameter of 60.0 mm as viewed on a plane is obtained by conducting the press-molding in quite the same manner as in Example 12(4) with the exception of constituting a set of molds by using the above-mentioned first mold and the second mold, setting the upper mold (the first mold) temperature to be 670° C., the lower mold (the second mold) temperature to be 640° C., and the pressing force to be 160 kg/cm$^2$.

On one surface of the diffraction grating are formed a total of 50 sets of laminar grating portions of a predetermined length constituted by a predetermined number of grooves having a width of 30 $\mu$m and a depth of 0.4 $\mu$m maintaining a pitch of 60 $\mu$m. The grooves constituting the laminar grating portions are formed maintaining a accuracy of 30.0 $\mu$m±1% in width and 0.4 $\mu$m±3% in depth.

A diffraction grating same as the one mentioned above is obtained by conducting the press-molding in the same manner as described above with the exception of constituting a set of molds using the above-mentioned first mold, second mold and third mold, and using the first mold as the upper mold, using the second mold as the lower mold and using the third mold as the sleeve mold.

EXAMPLE 15

(1) Preparation of a First Mold by the Method cII.

First, amorphous carbon is used as a mold material. The mold material has the shape of a flat plate measuring 50.0 mm long, 50.0 mm wide, 2.0 mm thick and having a maximum surface roughness of 120 angstroms. Next, a resin layer is formed maintaining a thickness of 1.5 μm on one surface of the mold material. Then, in the same manner as in Example 13(1), ring patterns are drawn using an electron beam, the resin layer after drawn with the electron beam is developed to form a predetermined number of resist patterns, and the resist patterns are post-baked.

Then, by using these resist patterns as masks, one surface of the mold material is dry-etched for 10 minutes. The dry-etching is effected by using a reactive etching apparatus of the type of Inductively Coupled Plasma, and an Ar gas is used as the etching gas. The etching conditions consist of a coil bias of 600 W, a substrate bias of 300 W, an Ar gas flow rate of 20.0 sscm, and a pressure of 5.0 mTorr.

Under the above-mentioned dry-etching conditions, the resist patterns are etched at a rate of 0.11 μm/min, and the surface of the mold material of the side on where the resist patterns are formed is etched at a rate of 0.09 μm/min except the portions that are protected by the resist patterns.

Then, the resist patterns are peeled off by using a predetermined peeling solution to obtain a first mold which is one of the molds CII of the present invention. A predetermined number of annular grooves having a line width of 3.0 μm and a depth of 0.9 μm are formed in a predetermined pattern in one surface of the first mold. In this mold, the surface of the side where the grooves are formed is serving as the transfer molding surface.

(2) Preparation of a Second Mold.

A block of amorphous carbon is cut and polished into a flat plate having a length of 50.0 mm, a width of 50.0 mm, a thickness of 2.0 mm and a maximum surface roughness of 120 angstroms to obtain a second mold which, when combined with the above-mentioned first mold, constitutes a set of molds of the side-free type.

(3) Preparation of a Third Mold.

A block of amorphous carbon is cut and polished into a cylinder of a predetermined size to obtain a third mold which, when it is combined with the above-mentioned first mold and the second mold, constitutes a set of molds comprising three molds of an upper mold (the first mold or the second mold), a lower mold (the second mold or the first mold) and a sleeve mold (the third mold).

(4) Press-molding.

A zone plate of the shape of a rectangular flat plate measuring 40.1×40.1 mm as viewed on a plane and having a thickness of 1.9 mm is obtained by conducting the press-molding in quite the same manner as in Example 13(4) with the exception of constituting a set of molds using the first mold and the second mold, using a preform of N5 (glass material produced by Hoya Co.) of a size of 40.0×40.0×2.0 mm and setting the upper mold (first mold) temperature to be 620° C.

A total of 150 ring patterns are formed like a matrix on one surface of the zone plate. The ring patterns are formed by a predetermined number of annular grooves that are concentrically formed maintaining a predetermined pitch, each annular groove having a line width of 3.0 μm and a depth of 0.9 μm. The annular grooves constituting the ring patterns are formed maintaining a accuracy of 3.0 μm±3% in width and 0.9 μm±3% in depth.

A zone plate same as the one mentioned above is obtained by conducting the press-molding in the same manner as described above with the exception of constituting a set of molds using the first mold, second mold and third mold, and using the first mold as an upper mold, using the second mold as a lower mold and using the third mold as a sleeve mold.

By using the mold A of the present invention as described above by way of working examples, it is made possible to obtain, by press-molding, a optical element fixing member and having alignment marks at desired portions. Therefore, the optical element fixing member are produced in large quantities and cheaply, making it possible to optically connect together, in short periods of time; the optical elements to be fixed or mounted or to optically connect together the optical elements between the optical element fixing members on which the optical elements have been fixed or mounted.

The methods bI and bII of the present invention make it possible to easily obtain a mold having a highly accurately formed transfer molding surface constituted by transfer patterns of any desired shape and, hence, to easily obtain, by press-molding, a molded article on which ruggedness of a predetermined shape are highly accurately formed like a optical element fixing member.

The molds CI and CII of the present invention is the one which capable of easily obtaining molds having a transfer pattern of a predetermined shape maintaining a high accuracy and featuring a long life. Therefore, use of the mold CI or the mold CII makes it possible to produce, by press-molding, glass molded articles such as diffraction elements made of a glass at a further decreased cost.

What is claimed is:

1. A method of producing a mold having a transfer molding surface constituted by a plurality of transfer patterns and is used for press-molding a shaping material into an article of a predetermined shape, wherein alignment mark(s) is/are formed on a mold material by dry-etching, and the mold material is worked using the alignment mark(s) as reference(s) in order to form the transfer molding surface constituted by the plurality of transfer patterns.

2. A method according to claim 1, wherein a rare gas, a simple carbon fluoride containing or a simple chlorine containing gas, is/are used as the etching gas(es) at the time of forming the alignment mark(s) by dry-etching.

3. A method of producing a mold having a transfer molding surface constituted by a plurality of transfer patterns and is used for press-molding a shaping material into an article of a predetermined shape, wherein alignment mark(s) is/are formed on a mold material by dry-etching, the mold material is worked by using the alignment mark(s) as reference(s) in order to form a transfer molding bare surface constituted by bare transfer patterns that serve as bases for the transfer patterns, and a mold release film is formed so as to cover at least the transfer molding bare surface, the surface of the mold release film serving as a transfer surface.

4. A method according to claim 3, wherein a single kind of gas or plural kinds of gases selected from the group consisting of a rare gas, a simple carbon fluoride containing gas, and a simple chlorine containing gas is/are used as the etching gas(es) at the time of forming the alignment mark(s) by dry-etching.

* * * * *